(12) United States Patent
Gotoh et al.

(10) Patent No.: US 10,484,572 B2
(45) Date of Patent: Nov. 19, 2019

(54) IMAGE READING APPARATUS

(71) Applicant: CANON DENSHI KABUSHIKI KAISHA, Chichibu-shi, Saitama (JP)

(72) Inventors: Yuji Gotoh, Kawaguchi (JP); Hiroshi Komuro, Wako (JP); Tatsuya Nishi, Funabashi (JP); Yoshihiro Taniike, Tokyo (JP)

(73) Assignee: Canon Denshi Kabushiki Kaisha, Chichibu-shi (JP)

( * ) Notice: Subject to any disclaimer, the term of this patent is extended or adjusted under 35 U.S.C. 154(b) by 0 days.

(21) Appl. No.: 15/979,076

(22) Filed: May 14, 2018

(65) Prior Publication Data

US 2018/0262646 A1 Sep. 13, 2018

Related U.S. Application Data

(63) Continuation of application No. PCT/JP2016/084284, filed on Nov. 18, 2016.

(30) Foreign Application Priority Data

Nov. 20, 2015 (JP) .................................. 2015-228151
Nov. 20, 2015 (JP) .................................. 2015-228152
(Continued)

(51) Int. Cl.
*H04N 1/04* (2006.01)
*H04N 1/409* (2006.01)
(Continued)

(52) U.S. Cl.
CPC ........... *H04N 1/4095* (2013.01); *G03B 27/62* (2013.01); *G03G 15/00* (2013.01); *G06T 1/00* (2013.01);
(Continued)

(58) Field of Classification Search
CPC .... H04N 1/4095; H04N 1/00742; H04N 1/04; H04N 1/028; H04N 1/00; H04N 2201/044; G06T 1/00; G03G 15/00; G03B 27/62
See application file for complete search history.

(56) References Cited

U.S. PATENT DOCUMENTS 5,261,634 A * 11/1993 Nakamura ........... G03G 15/605
248/441.1
6,323,933 B1 11/2001 Anzai ............................ 355/23
(Continued)

FOREIGN PATENT DOCUMENTS

JP H05-74072 U 10/1993
JP 2001-016412 1/2001
(Continued)

OTHER PUBLICATIONS

International Search Report dated Feb. 7, 2017 in counterpart PCT/JP2016/084284.

*Primary Examiner* — Kent Yip
(74) *Attorney, Agent, or Firm* — Venable LLP

(57) ABSTRACT

There is provided an image reading apparatus including a first reading sensor provided in a first reading unit and configured to read one surface of the sheet, a second reading sensor provided in a second reading unit provided to face the first reading sensor and configured to read an image on the other surface of the sheet, a first background portion serving as a reading background of the first reading sensor, a second background portion serving as a reading background of the second reading sensor, and a moving portion configured to integrally move the first reading sensor and the second background portion, wherein the first reading unit includes a sensor case in which the first reading sensor is provided, and the sensor case is fixed to the apparatus main body.

13 Claims, 24 Drawing Sheets

(30) Foreign Application Priority Data

Nov. 20, 2015 (JP) .................................. 2015-228153
Nov. 20, 2015 (JP) .................................. 2015-228154

(51) Int. Cl.
| | | |
|---|---|---|
| *G03G 15/00* | (2006.01) | |
| *G03B 27/62* | (2006.01) | |
| *G06T 1/00* | (2006.01) | |
| *H04N 1/00* | (2006.01) | |
| *H04N 1/028* | (2006.01) | |
| *H04N 1/203* | (2006.01) | |

(52) U.S. Cl.
CPC ........... *H04N 1/00* (2013.01); *H04N 1/00742* (2013.01); *H04N 1/028* (2013.01); *H04N 1/04* (2013.01); *H04N 1/2032* (2013.01); *H04N 2201/044* (2013.01)

(56) References Cited

U.S. PATENT DOCUMENTS

| | | | |
|---|---|---|---|
| 7,656,562 B2 | 2/2010 | Machida | 358/461 |
| 8,149,476 B2 | 4/2012 | Hamada et al. | 358/474 |
| 8,164,804 B2 | 4/2012 | Tanaka et al. | 358/474 |
| 9,270,863 B2 | 2/2016 | Hori et al. | H04N 1/4072 |
| 2006/0193015 A1* | 8/2006 | Machida | H04N 1/203 |
| | | | 358/474 |

FOREIGN PATENT DOCUMENTS

| | | |
|---|---|---|
| JP | 2003-179726 | 6/2003 |
| JP | 2004-320331 | 11/2004 |
| JP | 2005-328266 | 11/2005 |
| JP | 2006-245679 | 9/2006 |
| JP | 2007-258959 | 10/2007 |
| JP | 2007-281586 | 10/2007 |
| JP | 2009-278383 | 11/2009 |
| JP | 2012-098607 | 5/2012 |
| JP | 2015-198299 | 11/2015 |

\* cited by examiner

IMAGE READING APPARATUS

This application is a continuation of International Patent Application No. PCT/JP2016/084284 filed on Nov. 18, 2016, and claims priority to Japanese Patent Application Nos. 2015-228153, 2015-228151, 2015-228152, and 2015-228154, filed Nov. 20, 2015, the entire contents of which are incorporated herein by reference.

TECHNICAL FIELD

The present invention relates to an image reading apparatus for reading an original while conveying the original.

BACKGROUND ART

There is conventionally provided an image reading apparatus that causes two image reading units to read images on the obverse and reverse surfaces of an original and is mounted with both white and black background members. To suppress show-through when an original is a thin paper sheet, the black surface is arranged behind the original. To suppress reading of a portion around an original in black when the original is of an irregular size, the white surface is arranged behind the original.

To switch the background color, a movable mechanism is required. In an image reading apparatus described in PTL 1, there is proposed a method of switching the background color by causing the movable mechanism to move one of reading units for the obverse and reverse surfaces in a conveyance direction to change the position of an image reading portion. In this arrangement, when the reading unit moves, a white background plate or a black background plate is arranged to face the reading positions of the image reading units for both the obverse and reverse surfaces.

CITATION LIST

Patent Literature

PTL 1: Japanese Patent Laid-Open No. 2001-16412

SUMMARY OF INVENTION

Technical Problem

However, if the technique described in PTL 1 is applied to background switching of the image reading apparatus including the two image reading units, it is necessary to ensure a space to move a housing including an optical system for reading each of the white background plate and the black background plate, thereby increasing the size of the overall apparatus.

Solution to Problem

According to the present invention, for example, there is provided an image reading apparatus comprising: an apparatus main body including a feeding unit for feeding a sheet; a first reading sensor provided in a first reading unit and configured to read one surface of the sheet moving along a conveyance path; a second reading sensor provided in a second reading unit provided to face the first reading sensor via the conveyance path and configured to read an image on the other surface of the sheet; a first background portion provided at a readable position of the first reading sensor and serving as a reading background of the first reading sensor; a second background portion provided at a readable position of the second reading sensor and serving as a reading background of the second reading sensor; and a moving portion configured to integrally move the first reading sensor and the second background portion along the conveyance path, wherein the first reading unit includes a sensor case in which the first reading sensor is provided, and the sensor case is fixed to the apparatus main body, and wherein the first reading unit is able to move between a position where the first reading unit faces to the first background portion and receives reflection light from the first background portion and a positon where a black background portion which does not have surface reflecting light to the first reading unit is placed.

Advantageous Effects of Invention

According to the present invention, it is possible to provide a technique of downsizing an apparatus by enabling background switching with a structure in which a reading unit is fixed to the main body of an image reading apparatus.

Other features and advantages of the present invention will be apparent from the following description taken in conjunction with the accompanying drawings. Note that the same reference numerals denote the same or like components throughout the accompanying drawings.

BRIEF DESCRIPTION OF DRAWINGS

The accompanying drawings, which are incorporated in and constitute a part of the specification, illustrate embodiments of the invention and, together with the description, serve to explain the principles of the invention.

DESCRIPTION OF EMBODIMENTS (First Embodiment)

Figure 1:
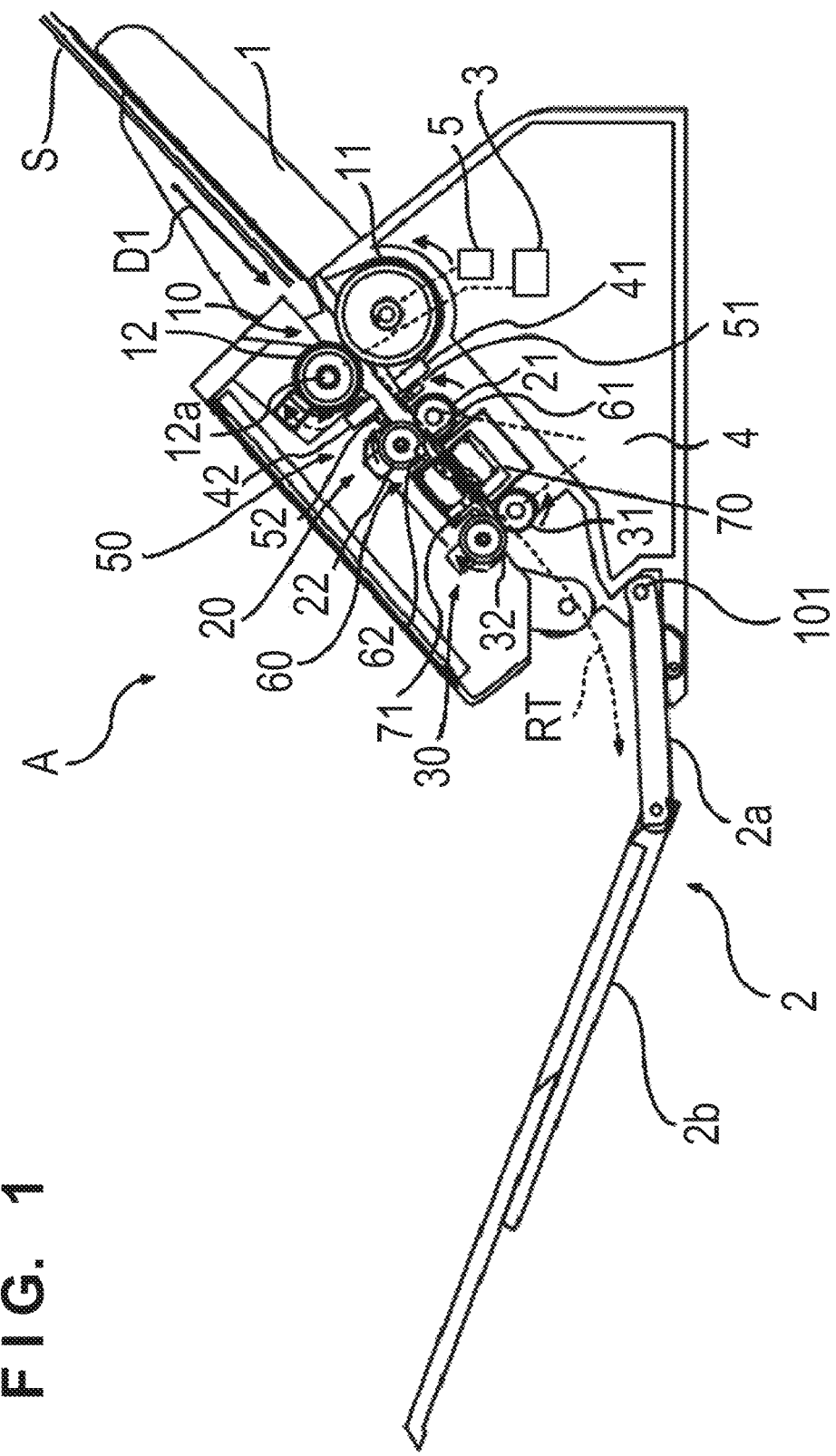
FIG. 1 is a schematic view showing an image reading apparatus according to the first embodiment of the present invention.

FIG. 1 is a schematic view showing an image reading apparatus A according to the first embodiment of the present invention.

<Arrangement of Apparatus>

The image reading apparatus A is an apparatus that conveys one or a plurality of conveyance media S stacked on a mounting table 1 into the apparatus through a route RT one by one, reads an image of the medium, and discharges the medium to a discharge tray 2. The read conveyance medium S may be, for example, a sheet such as an OA sheet, check, business card, or card, and may be a thick or thin sheet. Examples of cards are a health insurance card, license, and credit card. The conveyance medium S includes a book such as a passport. When a book is a target, a holder can be used. When a book in a double-page spread state is stored in the holder and placed on the mounting table 1, the book is conveyed together with the holder, and an image of the book can be read.

<Feeding>

A first conveyance unit 10 serving as a feeding mechanism that feeds the conveyance medium S along the route RT is provided. In this embodiment, the first conveyance unit 10 includes a feed roller 11 and a separation roller 12 facing the feed roller 11, and sequentially conveys the conveyance media S on the mounting table 1 in a conveyance direction D1 one by one. A driving unit 3 such as a motor transfers a driving force to the feed roller 11 via a transfer unit 5, and the feed roller 11 is rotationally driven in the direction of an arrow in FIG. 1 (in a positive direction in which the conveyance medium S is conveyed along the route RT). The transfer unit 5 is, for example, an electromagnetic clutch, and interrupts the driving force transferred from the driving unit 3 to the feed roller 11.

<Driving Unit>

In this embodiment, the transfer unit 5 that connects the driving unit 3 and the feed roller 11 is normally set in a state in which the driving force is transferred, and interrupts the driving force when the conveyance medium S is conveyed in a backward direction. If the transfer unit 5 interrupts the transfer of the driving force, the feed roller 11 is set in a freely rotatable state. Note that the transfer unit 5 need not be provided if the feed roller 11 is driven only in one direction.

<Separation Structure>

The separation roller 12 facing the feed roller 11 is a roller for separating the conveyance media S one by one, and is in press contact with the feed roller 11 with a constant pressure. To ensure this press contact state, the separation roller 12 is swingably provided and is configured to be biased against the feed roller 11. The driving unit 3 transfers a driving force to the separation roller 12 via a torque limiter 12a, and the separation roller 12 is rotationally driven in the direction of a solid-line arrow (in a direction opposite to the positive direction of the feed roller 11).

Since the transfer of the driving force to the separation roller 12 is regulated by the torque limiter 12a, when the separation roller 12 abuts against the feed roller 11, the separation roller 12 rotates together with the feed roller 11 (in the direction of a broken-line arrow). With this operation, if the plurality of conveyance media S are conveyed to a press-contact portion between the feed roller 11 and the separation roller 12, two or more conveyance media S except one conveyance medium S are dammed not to be conveyed.

Note that the separation mechanism is formed by the separation roller 12 and the feed roller 11 in this embodiment. However, such separation mechanism need not always be provided. Any feeding mechanism that sequentially feeds the conveyance media S to the route RT one by one can be used. If the separation mechanism is provided, a separation pad that applies a friction force to the conveyance media S may be brought into press contact with the feed roller 11 to perform the same separation operation, instead of the component such as the separation roller 12.

<Conveyance Structure>

A second conveyance unit 20 serving as a conveyance mechanism on the downstream side of the first conveyance unit 10 in the conveyance direction includes a driving roller 21 and a driven roller 22 driven by the driving roller 21, and conveys, to the downstream side, the conveyance medium S conveyed from the first conveyance unit 10. A driving unit 4 such as a motor transfers a driving force to the driving roller 21, and the driving roller 21 is rotationally driven in the direction of an arrow in FIG. 1. The driven roller 22 is in press contact with the driving roller 21 with a constant pressure, and rotates together with the driving roller 21. The driven roller 22 may be configured to be biased against the driving roller 21 by a biasing unit (not shown) such as a spring.

A third conveyance unit 30 on the downstream side of the second conveyance unit 20 in the conveyance direction includes a driving roller 31 and a driven roller 32 driven by the driving roller 31, and conveys the conveyance medium S conveyed from the second conveyance unit 20 to the discharge tray 2. That is, the third conveyance unit 30 functions as a discharge mechanism. The driving unit 4 such as a motor transfers the driving force to the driving roller 31, and the driving roller 31 is rotationally driven in the direction of an arrow in FIG. 1. The driven roller 32 is in press contact with the driving roller 31 with a constant pressure, and rotates together with the driving roller 31. The driven roller 32 may be configured to be biased against the driving roller 31 by a biasing unit (not shown) such as a spring.

The discharge tray 2 is axially supported via a first hinge 101 provided in a lower portion of the image reading apparatus A so as to be pivotable with respect to the image reading apparatus A. The discharge tray 2 is formed from a first discharge tray 2a on the side of the first hinge 101 and a second discharge tray 2b connected to the distal end of the first discharge tray 2a. The second discharge tray 2b is axially supported to be pivotable with respect to the first discharge tray 2a.

<Image Reading Structure, Control>

In the image reading apparatus A according to this embodiment, an image reading unit 70 or 71 arranged between the second conveyance unit 20 and the third conveyance unit 30 reads an image, and thus the second conveyance unit 20 and the third conveyance unit 30 convey the conveyance medium S at a constant speed. By always setting a conveyance speed to a speed equal to or higher than the conveyance speed of the first conveyance unit 10, it is possible to reliably avoid a situation in which the succeeding conveyance medium S catches up with the preceding conveyance medium S. For example, in this embodiment, speed control is performed so that the conveyance speed of the conveyance medium S by the second conveyance unit 20 and the third conveyance unit 30 is higher than that by the first conveyance unit 10.

Note that even if the conveyance speed of the conveyance medium S by the second conveyance unit 20 and the third conveyance unit 30 is set to be equal to that by the first conveyance unit 10, it is possible to form a minimum interval between the preceding conveyance medium S and the succeeding conveyance medium S by controlling the driving unit 3 to intermittently shift the feed start timing of the succeeding conveyance medium S.

<Double Feed Detection>

A double feed detection sensor 40 arranged between the first conveyance unit 10 and the second conveyance unit 20 is an example of a detection sensor (a sensor for detecting the behavior or state of a sheet) for detecting a state in which the conveyance media S such as sheets pass through the first conveyance unit 10 while being in tight contact with each other due to static electricity or the like (that is, a double feed state in which sheets overlapping each other are conveyed). Various kinds of sensors can be used as the double feed detection sensor 40. In this embodiment, an ultrasonic sensor is used, which includes an ultrasonic transmission unit 41 and an ultrasonic reception unit 42, and detects double feed on the principle that the attenuation amount of an ultrasonic wave passing through the conveyance medium S when the conveyance media S such as paper sheets are conveyed one by one is different from that of an ultrasonic wave passing through the conveyance media S when the conveyance media S are double-fed.

<Registration Sensor>

A medium detection sensor 50 arranged on the downstream side of the double feed detection sensor 40 in the conveyance direction is an example of an upstream-side detection sensor (a sensor for detecting the behavior or state of a sheet) arranged on the upstream side of the second conveyance unit 20 and on the downstream side of the first conveyance unit 10, and detects the position of the conveyance medium S conveyed by the first conveyance unit 10, more specifically, whether the end portion of the conveyance medium S has reached or passed through the detection position of the medium detection sensor 50. Various kinds of sensors can be used as the medium detection sensor 50. In this embodiment, an optical sensor is used, which includes a light emitting unit 51 and a light receiving unit 52 and detects the conveyance medium S on the principle that a light reception intensity (light receiving amount) changes when the conveyance medium S reaches or passes through.

In this embodiment, the medium detection sensor 50 is provided near the double feed detection sensor 40 on the downstream side of it so that when the medium detection sensor 50 detects the leading edge of the conveyance medium S, the conveyance medium S reaches a position at which the double feed detection sensor 40 can detect double feed. Note that the medium detection sensor 50 is not limited to the above-described optical sensor. For example, a sensor (image sensor or the like) capable of detecting the end portion of the conveyance medium S or a lever type sensor protruding to the route RT may be used.

A medium detection sensor 60 different from the medium detection sensor 50 is arranged on the upstream side of the image reading units 70 and 71. The medium detection sensor 60 is an example of a downstream-side detection sensor arranged on the downstream side of the second conveyance unit 20, and detects the position of the conveyance medium S conveyed by the second conveyance unit 20. Various kinds of sensors can be used as the medium detection sensor 60. In this embodiment, an optical sensor is used, similarly to the medium detection sensor 50, which includes a light emitting unit 61 and a light receiving unit 62 and detects the conveyance medium S on the principle that a light reception intensity (light receiving amount) changes when the conveyance medium S reaches or passes through. Note that in this embodiment, the medium detection sensors 50 and 60 are respectively arranged on the upstream and downstream sides of the second conveyance unit 20 in the conveyance direction. However, only one of the medium detection sensors 50 and 60 may be arranged.

<Arrangement of CIS>

Each of the image reading units 70 and 71 on the downstream side of the medium detection sensor 60 is, for example, a unit for optically scanning, performing conversion into an electrical signal, and reading the signal as image data, and includes a light source such as an LED, an image sensor, and a lens array.

<Explanation of Block Diagram>

Figure 2:
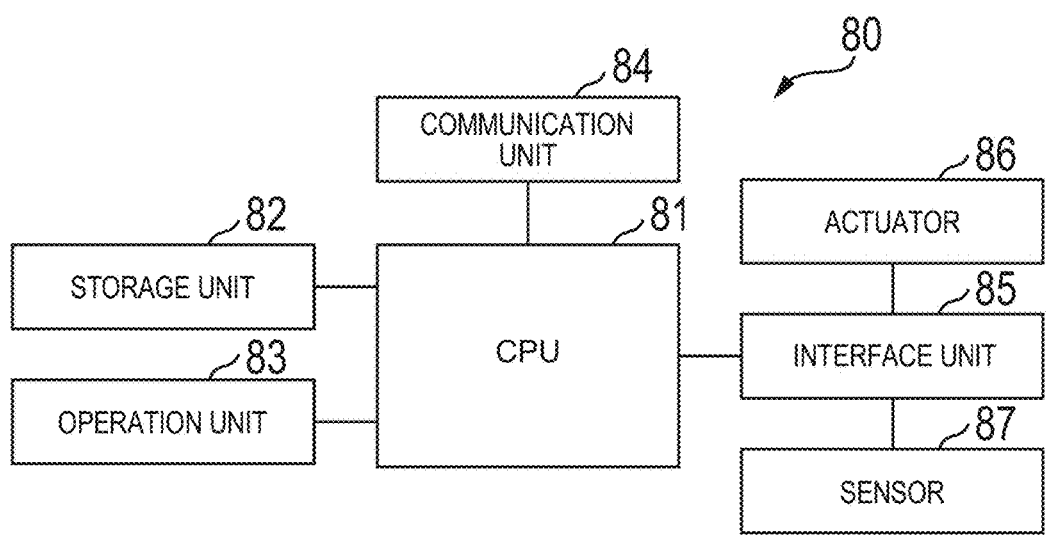
FIG. 2 is a block diagram showing a control unit of the image reading apparatus shown in FIG. 1.

A control unit 80 will be described with reference to FIG. 2. FIG. 2 is a block diagram showing the control unit 80 of the image reading apparatus A.

The control unit 80 includes a CPU 81, a storage unit 82, an operation unit 83, a communication unit 84, and an interface unit 85. The CPU 81 controls the overall image reading apparatus A by executing a program stored in the storage unit 82. The storage unit 82 is formed from, for example, a RAM or a ROM. The operation unit 83 is formed by, for example, a switch or a touch panel, and accepts an operation from an operator.

The communication unit 84 serves as an interface that communicates information with an external apparatus. Assuming a PC (Personal Computer) as an external apparatus, examples of the communication unit 84 are a USB interface and a SCSI interface. Instead of such a wired communication interface, a wireless communication interface may be used as the communication unit 84, or both a wired communication interface and a wireless communication interface may be provided.

The interface unit 85 is an I/O interface that inputs/outputs data to/from an actuator 86 and a sensor 87. The actuator 86 includes the driving units 3 and 4 and the transfer unit 5. The sensor 87 includes the double feed detection sensor 40, the medium detection sensors 50 and 60, and the image reading units 70 and 71.

<Driving by Receiving Start Instruction from PC>

The basic operation of the image reading apparatus A will be described. Upon receiving an image reading start instruction from, for example, an external PC connected to the image reading apparatus A, the control unit 80 starts to drive the first conveyance unit 10 to the third conveyance unit 30. The conveyance media S placed on the mounting table 1 are conveyed one by one from the conveyance medium S at the lowest position. Alternatively, the start time provided in the image reading apparatus A is accepted to start a reading operation.

<Control at Time of Double Feed>

During conveyance of the conveyance medium S, the double feed detection sensor 40 determines the presence/absence of double feed. If the absence of double feed is determined, conveyance is continued; otherwise, conveyance is stopped or feed of the succeeding conveyance medium S by the first conveyance unit 10 is stopped to discharge the conveyance media S in a double feed state.

<Start of Reading Based on Output from Registration Sensor>

At a timing based on the detection result of the medium detection sensor 60, the control unit 80 starts to cause the image reading unit 70 or 71 to read an image of the conveyance medium S conveyed by the second conveyance unit 20, primarily stores the read image, and transmits it to the external PC. The conveyance medium S whose image has been read is discharged by the third conveyance unit 30 to the discharge tray 2, thereby ending the image reading processing of the conveyance medium S.

<Discharge Structure>

Figure 3:
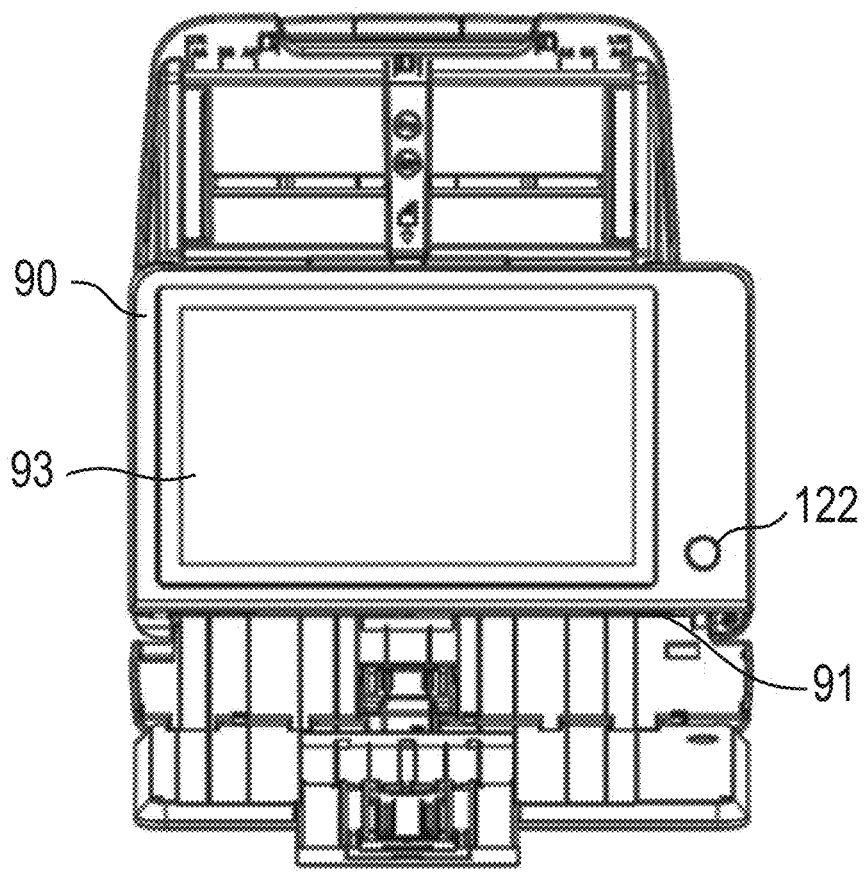
FIG. 3 is a front view showing the image reading apparatus according to the first embodiment of the present invention.

FIG. 3 is a front view showing a state in which the discharge tray 2 of the image reading apparatus A is opened according to the first embodiment of the present invention.

A display screen 93 is provided on a display panel 90 in an upper front portion, and an operation key 122 is provided at an adjacent position.

A discharge opening 92 is provided on a lower panel 91 in a lower front portion, to which the conveyance medium S conveyed by the third conveyance unit 30 is discharged.

Figure 4:
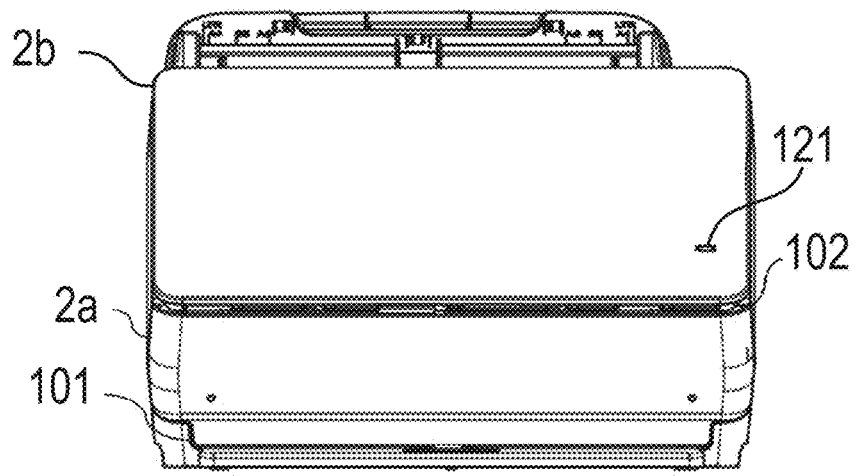
FIG. 4 is another front view showing the image reading apparatus according to the first embodiment of the present invention.

FIG. 4 is a front view showing a state in which the discharge tray 2 of the image reading apparatus A is stored according to the first embodiment of the present invention.

The discharge tray 2 is axially supported via the first hinge 101 provided in the lower portion of the image reading apparatus A so as to be pivotable with respect to the image reading apparatus A, and is configured to cover the front surface of the main body with the first discharge tray 2a and the second discharge tray 2b.

The first discharge tray 2a is attached to a main body 100 of the image reading apparatus A to be pivotable about the first hinge 101. The first discharge tray 2a is formed in the same size as an area obtained by combining the lower panel 91 and the discharge opening 92, pivots about the first hinge 101 in the stored state of the discharge tray 2 shown in FIG. 4, and is folded to cover the lower panel 91 and the discharge opening 92.

The second discharge tray 2b is formed in the same size as that of the display panel 90, pivots about a second hinge 102 provided at the distal end of the first discharge tray 2a in the stored state of the discharge tray 2 shown in FIG. 4, and is folded to overlap the display panel 90.

Figure 5:
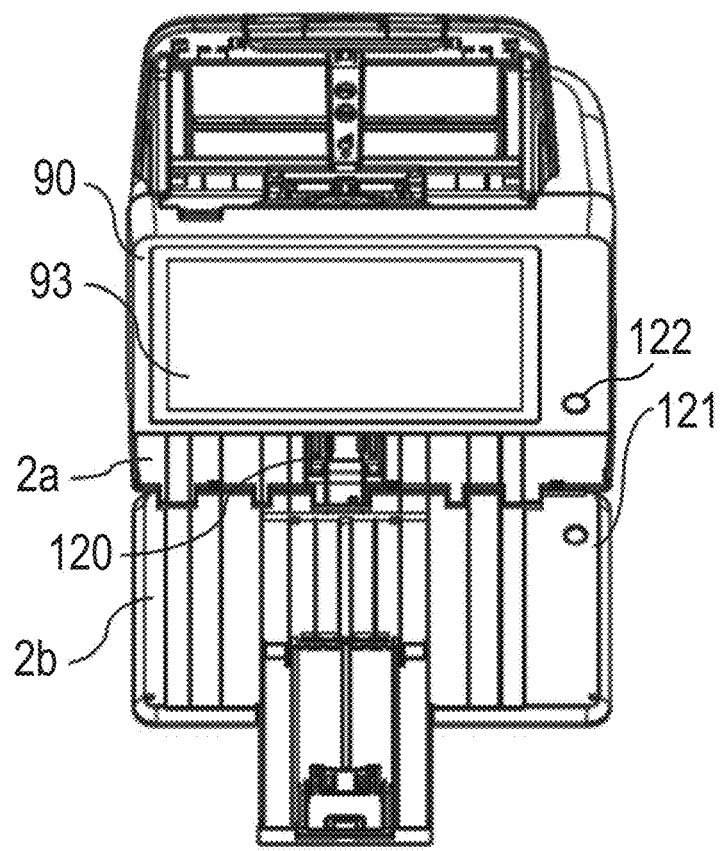
FIG. 5 is a plan view showing the image reading apparatus according to the first embodiment of the present invention.

FIG. 5 is a plan view showing a state in which the discharge tray 2 of the image reading apparatus A is opened according to the first embodiment of the present invention.

The conveyance medium S conveyed by the third conveyance unit 30 is discharged to the first discharge tray 2a via the discharge opening 92, and reaches and is guided to the second discharge tray 2b depending on the size of the conveyance medium S.

The first discharge tray 2a is provided with a discharge position adjustment member 120 to be pivotable. When, for example, the conveyance medium S of a small size, such as a business card, is discharged to the first discharge tray 2a, the discharge position adjustment member 120 is made to pivot to an upright state to adjust a position at which the conveyance medium S stops, thereby making it possible to prevent the discharged conveyance media S from being scattered.

In addition, the second discharge tray 2b is provided with a translucent portion 121 that is arranged at a position overlapping the operation key 122 provided in the display panel. The operation key 122 is a power button that turns on/off the power of the main body, and is configured to be turned on in a power-on state. With the translucent portion 121 arranged at the position overlapping the operation key 122, it is possible to confirm whether the operation key 122 is in an ON state or an OFF state even in the stored state of the discharge tray 2, thereby confirming the power supply state of the image reading apparatus A.

<Arrangement of Display Panel>

In the stored state of the second discharge tray 2b, the display screen 93 is arranged on the display panel 90 provided at a position overlapping the second discharge tray 2b.

The display screen 93 is arranged to have a center line X at the same position as that of the center line of a feeding tray 110 and a conveyance path width W. Note that a maximum conveyance path width Wmax of the image reading apparatus A according to the first embodiment of the present invention is set so as to feed a sheet of a A4 letter size, and is Wmax=216 mm. The width of the display screen 93 is 224 mm that exceeds Wmax.

This makes it possible to display, for example, a read image in actual size on the display screen 93, and a finishing state can be readily confirmed, thereby improving the user convenience.

<Details of Feed Structure>

Figure 6:
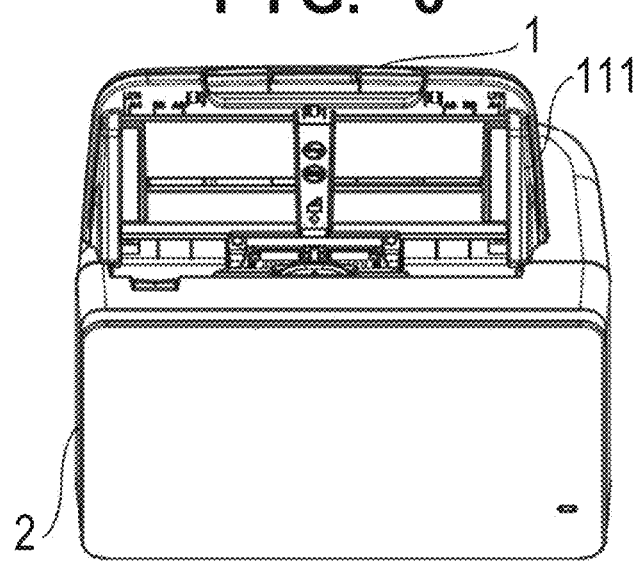
FIG. 6 is another plan view showing the image reading apparatus according to the first embodiment of the present invention.

FIG. 6 is a plan view showing the state in which the discharge tray 2 of the image reading apparatus A is stored according to the first embodiment of the present invention.

A regulating member 111 attached to be slidable in a direction perpendicular to the conveyance direction in accordance with the size of the arranged conveyance medium S is provided in the mounting table 1.

<Details of Upper Unit>

Figure 7:
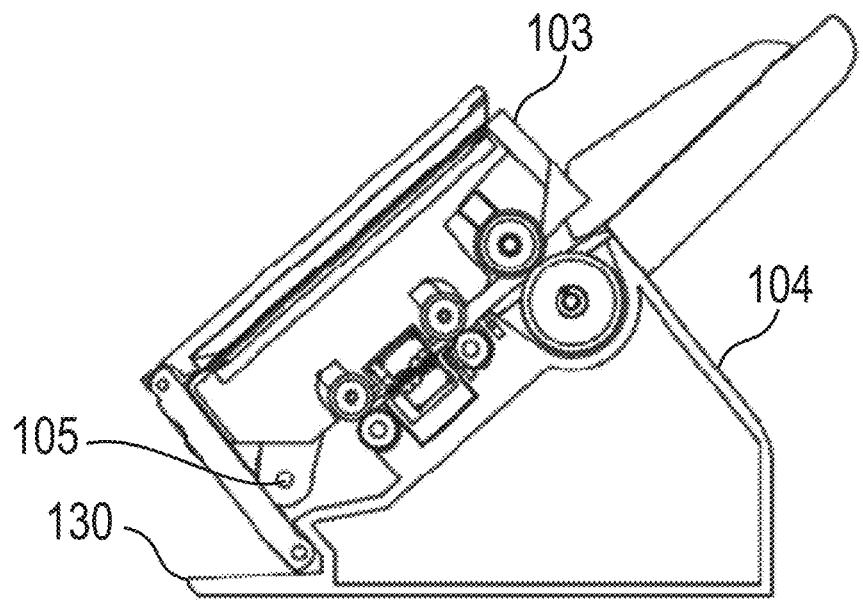
FIG. 7 is a schematic sectional view showing the image reading apparatus according to the first embodiment of the present invention.

FIG. 7 is a schematic sectional view showing the image reading apparatus A according to the first embodiment of the present invention.

The main body 100 is formed from an upper unit 103 and a lower unit 104, and the upper unit 103 is attached to be pivotable about a main body hinge 105 with respect to the lower unit 104.

Figure 8:
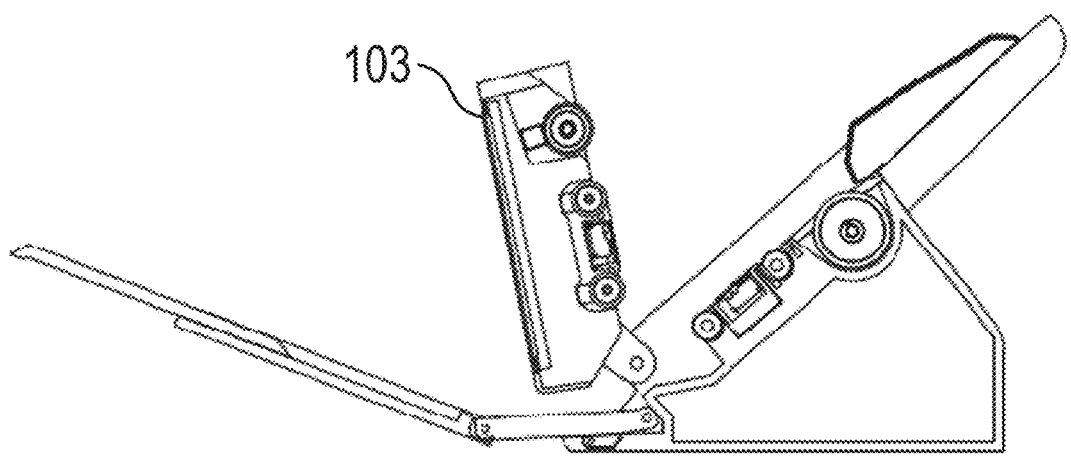
FIG. 8 is another schematic sectional view showing the image reading apparatus according to the first embodiment of the present invention.

Since the upper unit 103 includes, in the display panel 90, the display screen 93 having a width exceeding the maximum conveyance path width Wmax and the support frame metal plate of the display screen 93, the barycenter in a state in which the upper unit 103 is opened, as shown in FIG. 8, largely shifts toward the front side in the conveyance direction with respect to the stored state of the upper unit 103 shown in FIG. 1.

Therefore, the image reading apparatus A may fall if the upper unit is opened quickly. However, by providing a protruding portion 130 in the image reading apparatus A according to this embodiment, it is possible to prevent the image reading apparatus A from falling even if the barycenter moves along with opening of the upper unit 103. The protrusion amount of the protruding portion 130 is a protrusion amount that is accommodated under the discharge tray 2 in the stored state of the upper unit 103 and the discharge tray 2 shown in FIG. 7, and extends to the front side in the conveyance direction with respect to the barycenter of the upper unit 103 in the open state of the upper unit 103 shown in FIG. 8. This can prevent the image reading apparatus A from falling due to opening of the upper unit 103, and prevent the protruding portion from protruding more than necessary, in the stored state in which the discharge tray 2 is stored, not to impede the user.

<Discharge Tray Angle Adjustment>

A tray support portion 131 that abuts against the lower surface of the discharge tray 2 when the discharge tray 2 is opened is pivotably provided on the upper surface of the protruding portion 130.

Figure 9:
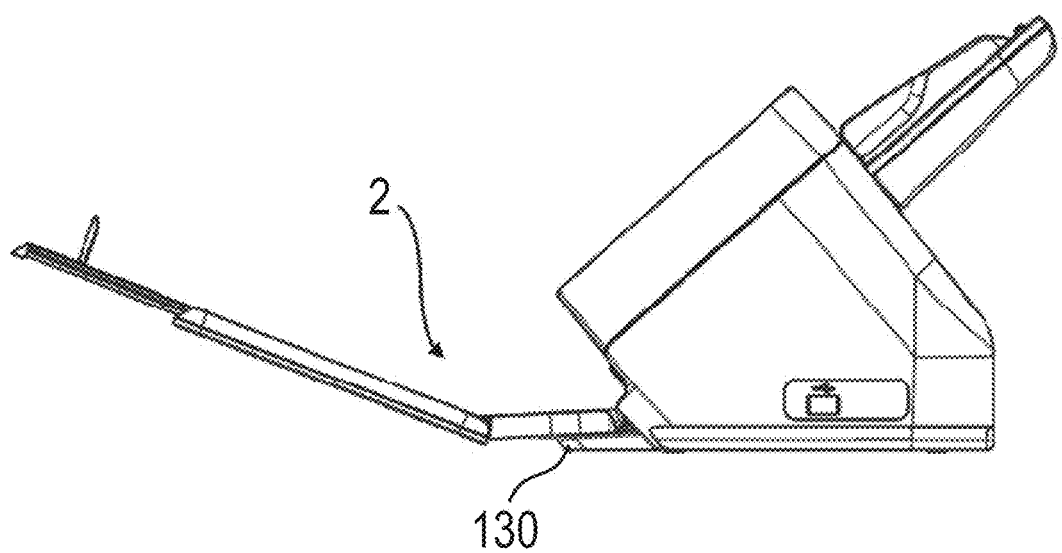
FIG. 9 is a side view showing the image reading apparatus according to the first embodiment of the present invention.
Figure 10:
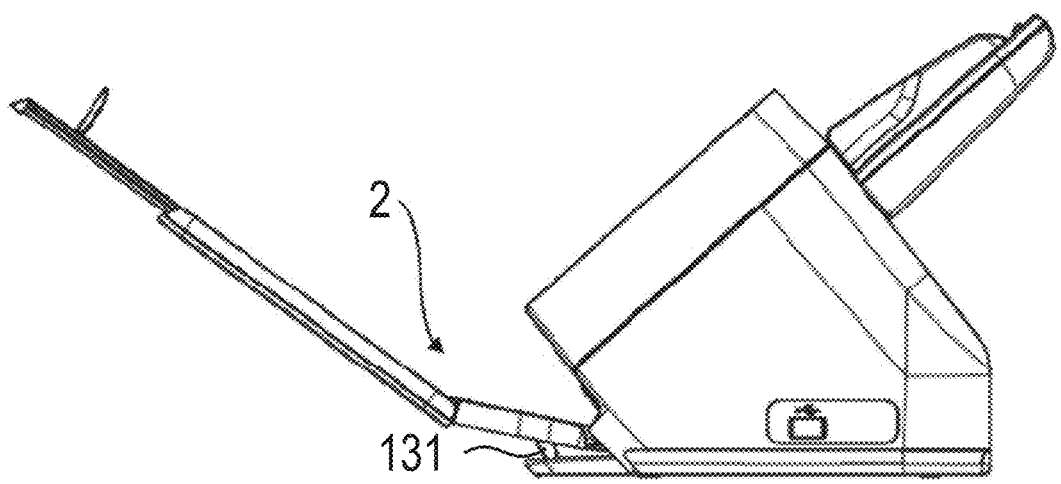
FIG. 10 is a side view showing the image reading apparatus according to the first embodiment of the present invention.

As shown in FIG. 9, in the open state, the discharge tray 2 is supported by the protruding portion 130 so as to receive the discharged conveyance medium S. As shown in FIG. 10, if the tray support portion 131 is made to pivot to protrude upward from the upper surface of the protruding portion 130, the tray support portion 131 abuts against the lower surface of the discharge tray 2 to support the discharge tray 2, thereby making it possible to adjust the angle of the discharge tray 2 from the state shown in FIG. 9 in which the discharge tray 2 is supported by the protruding portion 130.

For example, in the state shown in FIG. 10, the discharge tray 2 is lifted up in the vertical direction, as compared with the state shown in FIG. 9, thereby making it possible to change a position where the leading edge of the conveyance medium S lands on the upper surface of the discharge tray 2. Thus, in the state shown in FIG. 9, if the leading edge of the conveyance medium S to be discharged abuts against the trailing edge of the already discharged conveyance medium S to push it, it is possible to make the leading edge of the succeeding conveyance medium S reliably land on the upper surface of the already discharged conveyance medium S in addition to the effect of shifting the trailing edge of the already discharged conveyance medium S toward the lower unit 104 by changing the angle of the discharge tray 2, as shown in FIG. 10. With this arrangement, it is possible to significantly improve the aligning property of the discharged conveyance media S on the discharge tray 2.

Note that the tray support portion 131 may be configured to support the discharge tray 2 even in the middle of the pivoting range, thereby adjusting the angle of the discharge tray 2 in a plurality of stages. In this case, each conveyance medium S can be received at an angle at which the aligning property on the discharge tray 2 is highest, thereby improving the usability.

<Reading Sensor Arrangement>

The image reading units 70 and 71 are covered with sensor cases 70a and 71a formed by mold members, respectively, and each have a structure in which a glass is provided on the original conveyance surface side. The image reading unit 71 is movable in the conveyance direction and the vertical direction, and the image reading unit 70 is fixed to the lower unit 104.

An arrangement in the sensor cases 70a and 71a of the image reading units 70 and 71 will be described with reference to FIGS. 12A and 12B.

The sensor cases 70a and 71a include CISs 72 and 73 as reading sensors and white reference boards 74 and 75, respectively. Photoelectrical conversion elements placed on a line and light emitting elements 150 and 151 for irradiating the conveyance medium S are provided. The CIS 72 in the image reading unit 70 reads the obverse surface of the conveyance medium S. The CIS 73 in the image reading unit 71 reads the reverse surface of the conveyance medium S.

The CISs 72 and 73 are identical members, and are arranged to have point symmetry with respect to the conveyance surface. The use of the identical members has an effect of reducing the cost, and the arrangement is common to the obverse and reverse surfaces, thereby implementing simplification.

The white reference boards 74 and 75 are adhered to the CISs 72 and 73, respectively. Light with which an original is irradiated through a light guide is reflected by the white reference board 74 or 75 to enter a lens 152 or 153, and thus the background color becomes white. A black background portion 76 or 77 is part of a housing in which the CIS 72 or 73 and the white reference board 74 or 75 are arranged. When the CIS moves, the surface that reflects light with which the original is irradiated via the light guide disappears. In addition, there is a slope of an angle that prevents reflected light from directly entering an opposite lens even if the light reaches the black background portion. This changes the background color into black. The inner walls of the sensor cases 70a and 71a of the image reading units 70 and 71 are made of a material for absorbing light beams reflected by the black background portions 76 and 77. Alternatively, members that do not reflect light beams by absorbing them may be arranged. However, it is preferable to provide the members to include opposite positions in a direction parallel to the conveyance path with respect to the black background portions 76 and 77, and set each of the slopes of the black background portions 76 and 77 to form an angle of 45° or more with respect to the conveyance path, thereby preventing incident light from being guided in the direction of the opposite lens by being reflected by the inner wall of the sensor case 70a or 71a.

Figure 12A:
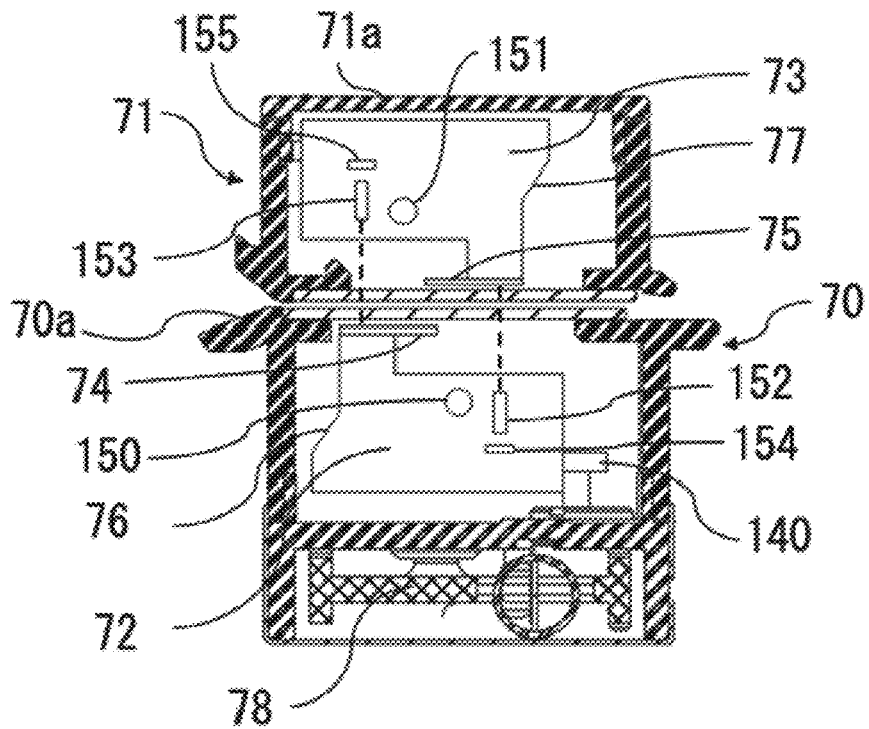
FIG. 12A is a schematic sectional view showing the image reading apparatus according to the first embodiment of the present invention.
Figure 12B:
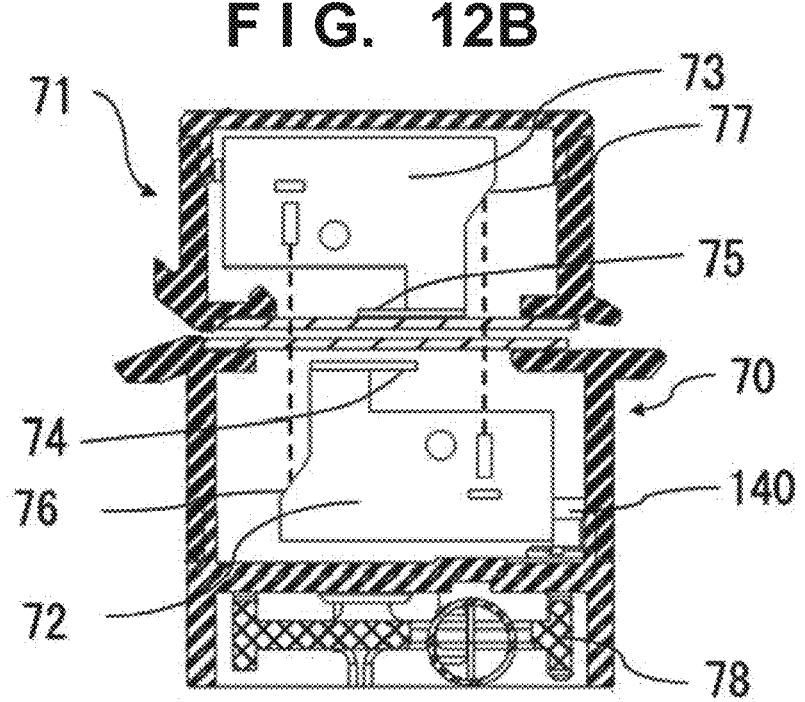
FIG. 12B is a schematic sectional view showing the image reading apparatus according to the first embodiment of the present invention.

Referring to FIGS. 12A and 12B, the white reference board is separated from the black background portion. However, the black background portion may be adjacent to the white reference board.

The white reference board 74 is adhered so that part of it protrudes from the CIS 72 toward the light receiving/emitting element, as shown in FIGS. 12A and 12B. Thus, the white reference board 74 shields light traveling from the light emitting element 151 to a light receiving element 154 of the opposite sensor. That is, the white reference board also functions as a light-shielding plate. The white reference board 75 of the opposite sensor has the same arrangement and has the same effect.

To improve the effect of shielding the light traveling from the light emitting element 151 to the light receiving element 154 of the opposite CIS 72, the light emitting element 151 is preferably adjacent to the white reference board 74 when viewed from the conveyance path side. In other words, the light emitting element 151 is preferably arranged so that projections of the light emitting element 151 and the white reference board 75 onto the conveyance path are adjacent to each other.

If the white reference board 75 and the light emitting element 151 are close to each other, the white reference board 75 exists in a direction of the lens 152 of the opposite CIS 72 and the light receiving element 154, thereby improving the light-shielding effect. Therefore, the white reference board 75, the light emitting element 151, and a light receiving element 155 are preferably arranged along the conveyance path in that order. The same applies to the white reference board 75 of the opposite sensor.

<Background Switching Arrangement>

Figure 11:
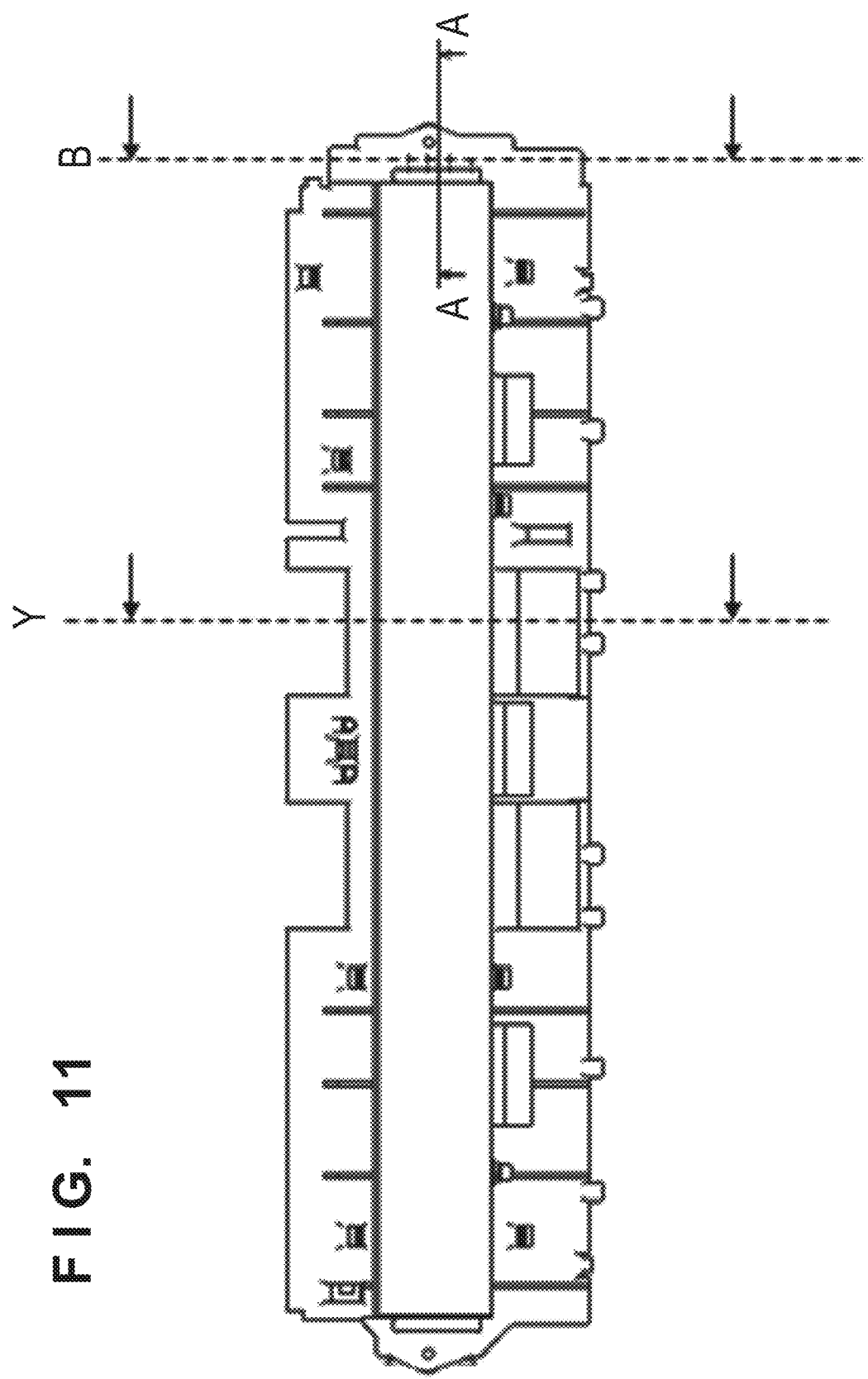
FIG. 11 is a schematic sectional view showing the image reading apparatus according to the first embodiment of the present invention.

A background color switching arrangement will be described next. FIG. 11 is a plan view showing the image reading unit according to this embodiment.

FIGS. 12A and 12B are sectional views each showing a section Y shown in FIG. 11. FIG. 12A corresponds to a position in a white background state and FIG. 12B corresponds to a position in a black background state.

The CIS 72 of the image reading unit 70 transmits a driving force of a CIS sliding motor 79 arranged in the lower unit 104 via a transfer member 78 provided in the image reading unit 70, thereby allowing the CIS 72 and the white reference board 74 adhered to the CIS to move in a direction parallel to the conveyance direction.

If the background color of a read image is set to white, the reading position of the CIS 72 is arranged at the position of the opposite white reference board 75, thereby enabling white background reading. At this time, since the CIS 72 and the white reference board 74 move integrally, if the CIS 72 is arranged at the white background position, the white reference board 74 is arranged at a position facing the reading position of the CIS 73, thereby enabling white background reading.

If the background color of a read image is set to black, the reading position of the CIS 72 is arranged at the position of the opposite black background portion 77, thereby enabling black background reading.

Light emitted from the light emitting element 150 in the CIS 72 is diffused on the slope of the black background portion 77 not to enter the light receiving element 154, thereby implementing black background reading.

If one CIS moves, the opposite sensor also relatively moves, and it is thus possible to perform background switching by a short distance. The movement of one CIS can switch the background colors of the first reading sensor 70 and the second reading sensor 71 at the same time.

If the white background reading position is set as a reference, it is necessary to perform adjustment control of the margin of the leading edge in accordance with the movement of the CIS at the time of black background reading. Since the moving amount of the CIS is determined, if the CIS 72 moves to the black background reading position, a reading start timing is changed in accordance with the moving amount of the CIS 72 to adjust the margin of the leading edge.

There is provided a black reference board as a conventional technique. Black background reading is implemented by arranging the reading position of the CIS at the position of the black reference board. However, if dust or paper powder adheres to the black reference board, the black reference board is contaminated and a reference value cannot be maintained. It is, therefore, necessary to perform correction control. In the present invention, even if the black background portion is contaminated, an image of the background color is not influenced. Thus, it is possible to maintain a black reference, and acquire a stable black reference without need of correction and the like.

The black background portion 76, the color reference board 74, and the light receiving/emitting portion 154 are arranged from left in the CIS 72 in FIG. 11. This arrangement can minimize the moving distance of the CIS.

Since the black background portion 77 needs to extend over the whole in the width direction of the apparatus, a transfer member connecting portion 140 is preferably on the opposite side of the black background portion.

Figure 13:
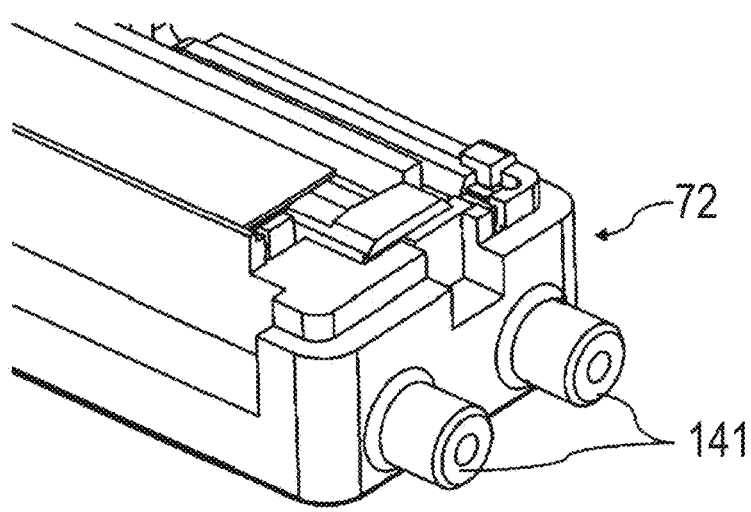
FIG. 13 is a perspective view showing a CIS.
Figure 14A:
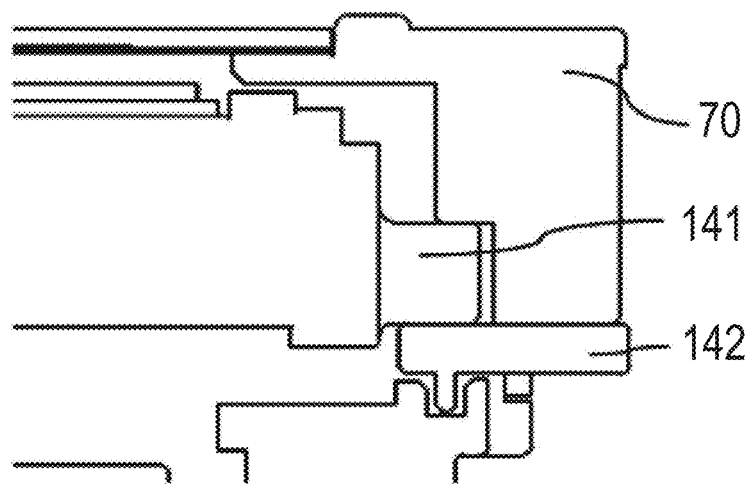
FIG. 14A is a sectional view showing a reading unit 70.
Figure 14B:
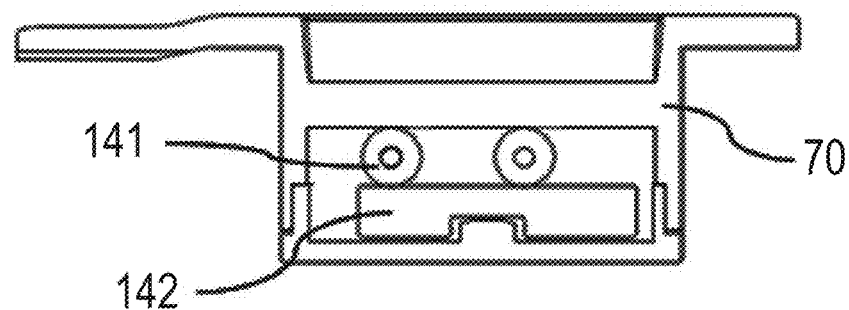
FIG. 14B is a sectional view showing the reading unit 70.

An arrangement in which the CIS 72 moves in the conveyance direction in the image reading unit 70 will be described with reference to FIGS. 13, 14A, and 14B. FIG. 13 is a perspective view showing the CIS. FIGS. 14A and 14B are sectional views each showing the image reading unit 70 and respectively showing sections A and B in FIG. 11.

Bosses 141 are provided in each end portion of the CIS 72 and sandwiched between the inner wall member of the image reading unit 70 and a guide member 142. When switching the background by driving of the CIS sliding motor 79, the CIS 72 moves along the guide in a direction parallel to the conveyance direction. The CIS has a feature of a short focus length, and is preferably translated along the guide to improve the position accuracy in the vertical direction and the conveyance direction as the reading direction. As the material of the boss 141, a highly slidable material different from the material of the sensor case 70a of the image reading unit 70 is preferably used.

Note that in this embodiment, the image reading units 70 and 71 are arranged in a sensor case shape to surround the CISs 72 and 73 as reading sensors, respectively. The image reading units 70 and 71 need not always be arranged in this way. An arrangement in which a reading sensor, a reference board, and a black reference portion or another color reference portion are movable integrally need only be provided.

Note that in the above description of the embodiment, a portion described concerning only the CIS 72 is preferably applied to the CIS 73.

(Second Embodiment)

The second embodiment of the present invention will be described below.

An example of a conventional image reading apparatus using a sheet-through automatic original feeder is formed from an upper unit and a lower unit, and the upper unit is provided with an image reading unit for reading one surface of an original, a display unit for a read image, various function switches for instructing to start reading, a power switch, and the like. The upper unit is configured to be opened/closed about a hinge opening/closing means with respect to the lower unit at a route RT along which an original is conveyed, thereby implementing a structure that readily undergoes maintenance by the user, for example, cleaning of an original conveyance path surface.

In recent years, the use purpose of the user becomes multi-purpose, and an improvement in operability of the image reading apparatus is required along with the multi-functionality and automation of the apparatus reflecting the needs. To achieve this, electronic components are provided everywhere in the apparatus due to the high density and multi-functionality of electrical components, thereby improving the operability. To improve the operability, electronic components are often provided on the front surface of an apparatus main body, which is readily operated by the user, and are often arranged in the upper unit of the apparatus (Japanese Patent Laid-Open No. 2015-198299).

The kinds of originals whose images are to be read by the image reading apparatus vary, such as a general OA sheet, a very thin sheet such as a slip, an original containing paper powder, and a plastic card. Since dust falling from an original or contamination in the apparatus main body is cleaned, the user has more and more opportunities of maintaining the apparatus. Therefore, in the image reading apparatus configured to be opened/closed at the original conveyance path, the number of times the upper unit is opened/closed increases.

On the other hand, to improve the operability and work efficiency, the image reading apparatus is speeded up. As a speed-up means, a conveyance speed at which an original is conveyed is increased in addition to a processing speed of a CPU or the like of the apparatus. The amount of static electricity generated at the time of original conveyance increases along with an increase in number of processing sheets. Occurrence of static electricity increases the possibility that an abnormal image or an operation error occurs due to noise or the like generated by discharge to the image reading unit and discharge to other electronic components. To prevent this, an anti-static brush, a ground metal plate, or the like is provided to ground a component in the conveyance path to steadily release charges before a certain amount of charges of static electricity or more is accumulated.

This embodiment provides a technique of preventing static electricity generated in the conveyance path from being accumulated to avoid an abnormality such as an operation error of an electric component while reducing an impact generated when closing the first unit provided to be opened/closed and protecting electric components and the like from damage.

In the second embodiment, the structure shown in FIGS. 1 to 10 described in the first embodiment is in common with the first embodiment and a description thereof will be omitted. The difference from the first embodiment will be described.

<Ground of Upper Unit>

Figure 15:
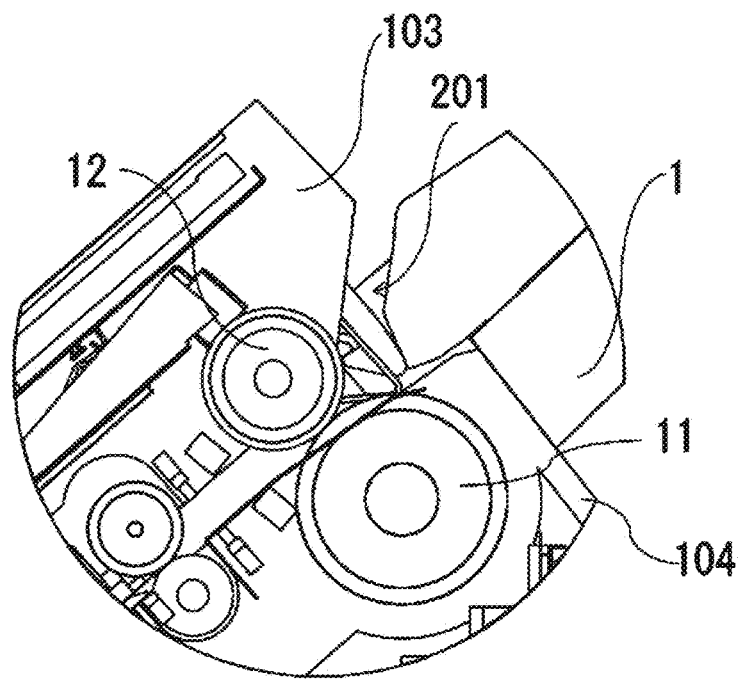
FIG. 15 is an enlarged view showing a portion near a feeding unit of an image reading apparatus according to the second embodiment of the present invention.

FIG. 15 is an enlarged view showing a portion near a feeding unit in a state in which an upper unit 103 of an image reading apparatus A is closed with respect to a lower unit 104 according to this embodiment.

Figure 16:
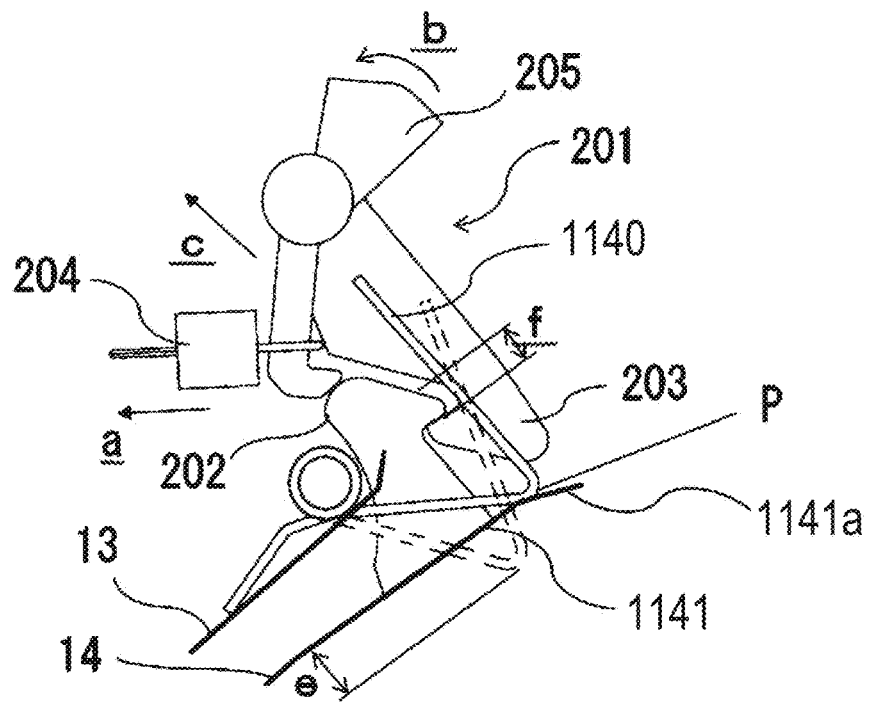
FIG. 16 is a schematic view showing a lock portion according to the second embodiment of the present invention.

If the upper unit 103 is made to pivot quickly when closed, a large impact is applied when the upper unit 103 contacts the lower unit 104, and loud noise may be generated. In the image reading apparatus A according to this embodiment, a lock member 201 that holds the upper unit 103 in the closed state and a conductive upper elastic member 1140 near the lock member 201 are provided. As shown in FIG. 16, the lock member 201 includes a hook claw 203 engaged with a hook portion 202 provided in the lower unit 104, and receives a force by a tension spring 204 in a direction (the direction of an arrow a) in which the hook claw 203 is engaged with the hook portion 202. When the hook portion 202 is engaged with the hook claw 203, the upper unit 103 is maintained in the closed state. By moving an operation arm 205 of the lock member 201 in the direction of an arrow b, the hook claw 203 is disengaged from the hook portion 202, thereby enabling the upper unit 103 to pivot in an opening direction about a main body hinge 105. As the upper elastic member 1140, for example, a wire spring such as a torsion spring is used, and has a force enough to push up the upper unit 103 in the direction of an arrow c.

When the upper unit 103 is set in the closed state, the upper unit 103 is closed while the upper elastic member 1140 is elastically biased against a contact portion 1141 provided on the side of the lower unit 104.

A slope is provided in part of the contact portion 1141. When the upper unit 103 is in the closed state, the upper elastic member 1140 reaches the slope to readily push up the upper unit 103 when the hook claw 203 is disengaged from the hook portion 202.

A state before the upper elastic member 1140 is biased is indicated by dotted lines, and a state after the upper elastic member 1140 is biased is indicated by solid lines. That is, a distance e corresponds to the displacement amount (deflection amount) of the upper elastic member. On the other hand, the engagement amount of the hook portion 202 and the hook claw 203 is represented by f. The relationship between the deflection amount and the engagement amount is e>f. If the hook claw 203 is disengaged from the hook portion 202, the upper unit 103 can be pushed up by the distance e.

The end portion of the upper elastic member 1140, that is attached to the upper unit 103, is conductive with ground of an electric component provided in the upper unit 103, and is conductive with ground of an electric component arranged in the lower unit when the upper elastic member 1140 contacts the contact portion 1141. Therefore, in the closed state of the upper unit 103, ground can be established via the upper elastic member 1140.

As described above, a slope 1141a is provided in part of the contact portion 1141, and the slope 1141a and the upper elastic member 1140 are configured to contact each other immediately before the upper unit 103 is set in the closed state. In a shape, as in this embodiment, formed when the contact between the upper elastic member 1140 and the contact portion 1141 contacts the contact portion 1141 at a top portion P bent into a V-shape, the contact can be made to contact the slope 1141a of the contact portion 1141 at a linear portion instead of contacting at the top portion P, thereby increasing the contact area.

Figure 17:
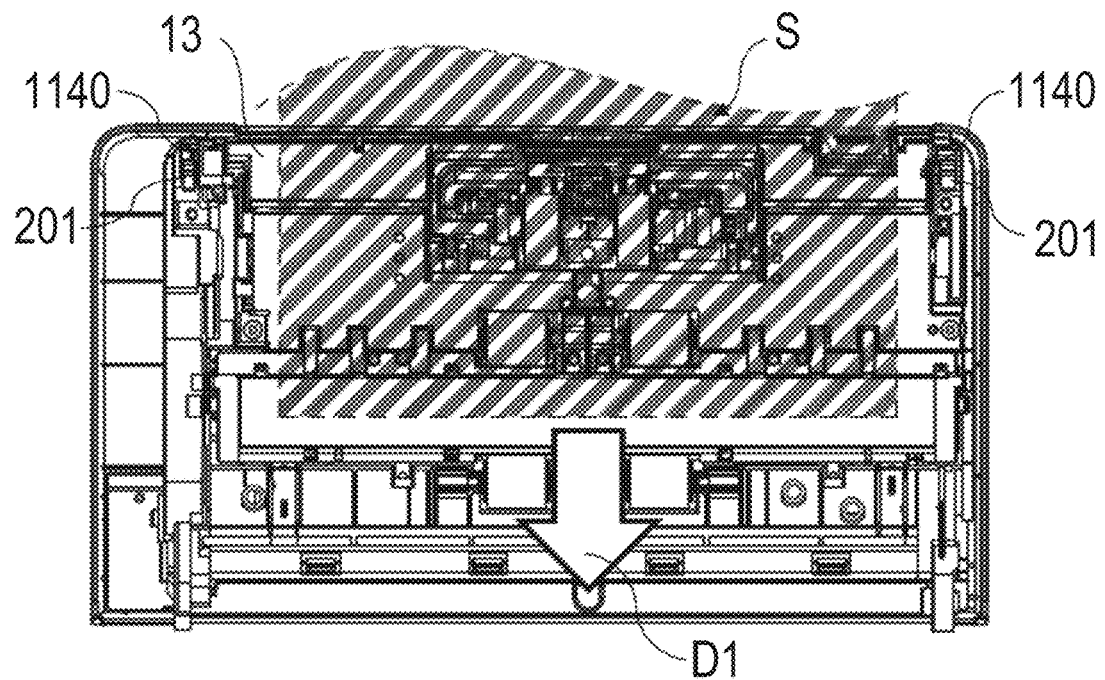
FIG. 17 is a front view showing an upper unit when viewed from a side of a conveyance path RT of the image reading apparatus according to the second embodiment of the present invention.

FIG. 17 is a front view showing the upper unit 103 of the image reading apparatus A when viewed from the side of the conveyance path RT according to this embodiment.

The upper elastic members 1140 are arranged outside the original conveyance path of the original conveyance surface together with the lock members 150, and located on the both sides of the original conveyance path in a direction perpendicular to the conveyance direction. With this arrangement, even if the upper unit 103 is quickly closed, the elastic members on both sides of the upper unit 103 are uniformly deflected. It is thus possible to prevent deformation such as instantaneous twist from occurring in the upper unit 103 while protecting the electric components in the upper unit 103 by reducing an impact by the upper elastic members 1140. Especially if a display screen 93 on a display panel 90, an operation key 122 at an adjacent position, and the like are provided in the upper unit 103, as described above, the weight of the upper unit 103 is heavy and many components are vulnerable to an impact, and thus it is particularly effective to reduce an impact on the electric components.

By arranging the upper elastic members 1140 near the lock members 150 separated from the main body hinges 105, the load at the time of biasing less varies, thereby making it possible to reduce an impact equally at the left and right.

Figure 18:
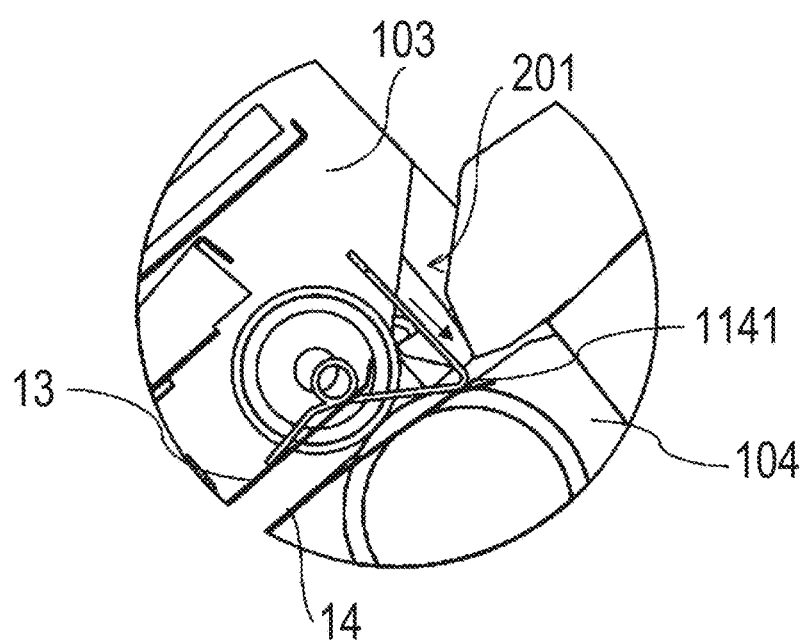
FIG. 18 is an enlarged view showing the main part of the image reading apparatus according to the second embodiment of the present invention.

FIG. 18 is a view showing the electrical connection state of the upper elastic member 1140 in the apparatus sectional view of the image reading apparatus A according to this embodiment.

One end of the upper elastic member 1140 contacts a conductive upper conveyance guide 13 (for example, a metal steel plate) provided as the conveyance path of the upper unit 103. The upper conveyance guide 13 is electrically connected to the upper metal member 1074 covering the image reading unit 70 (to be described later), and is also electrically connected, via the upper elastic member 1140, to the contact portion 1141 provided on the side of the lower unit 104.

Figure 19:
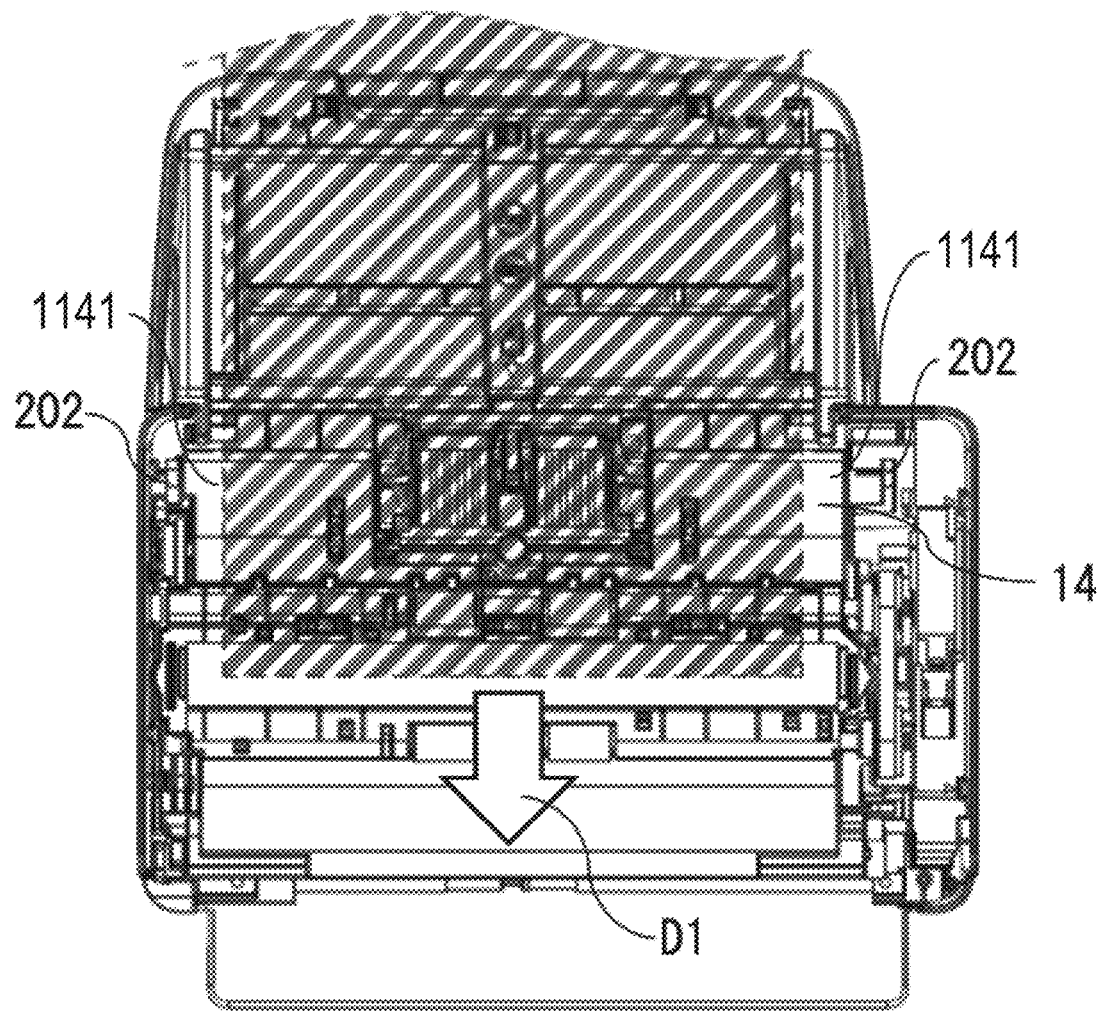
FIG. 19 is a front view showing the lower unit when viewed from the side of the conveyance path RT of the image reading apparatus according to the second embodiment of the present invention.

FIG. 19 is a front view showing the lower unit 104 of the image reading apparatus A when viewed from the side of the conveyance path RT according to this embodiment.

Parts of a conductive lower conveyance guide 14 (for example, a metal steel plate) forming the conveyance path serve as the contact portions 1141. The contact portions 1141 are located outside the conveyable range of a conveyance medium S, and the lock members are also located outside the conveyable range of the conveyance medium S.

In the image reading apparatus A according to the second embodiment of the present invention, static electricity generated by conveyance of the conveyance medium S flows into the upper conveyance guide 13 and the lower conveyance guide 14, and charges flowing into the upper conveyance guide 13 are electrically connected to the lower conveyance guide 14 by the upper elastic members 1140. Furthermore, when the upper elastic members 1140 are arranged on both sides of the conveyance path RT in the direction perpendicular to the conveyance direction, and made to contact the contact portions 1141, charges by static electricity are prevented from moving in one direction. Therefore, it is possible to prevent an operation error caused by noise that enters a signal of an image reading unit 70 due to a change in electromagnetic wave generated by the movement of the charges. Note that it is only necessary to arrange the upper elastic member 1140 on at least one side of the conveyance path RT, and a nonmetal elastic member may be provided on the other side. Alternatively, no member is provided on the other side to arrange the conveyance path RT close to the other side, thereby implementing downsizing.

The biasing forces of the upper elastic members 1140 push up the upper unit 103, preferably, by an amount enough to allow the user to insert fingers into a space formed by pushing up the upper unit 103. In this case, certain displacement amounts of the elastic members 1140 are required, and it is accordingly necessary to ensure certain lengths of the contact portions 1141 in a direction parallel to a conveyance direction D1. In this embodiment, it is possible to float the upper unit 103 to a desired height by making the elastic members 1140 abut against portions on both sides of the conveyance path, that have regions narrow in the width direction and can ensure regions of certain lengths in the conveyance direction D1. At the same time, it is possible to electrically connect the upper unit 103 and the lower unit 104 by establishing electrical contact. Furthermore, by establishing electrical contact on both sides of the conveyance path, it is possible to form an arrangement in which static electricity is readily released electrically to both the upper unit 103 and the lower unit 104 even if the conveyance medium S is charged by static electricity, and to take an effective measure against static electricity and the like in the overall arrangement instead of processing static electricity in the lower unit 104.

As is apparent from FIG. 16, when the upper unit 103 is closed with respect to the lower unit 102, the upper unit 103 is closed while the upper elastic member 1140 changes the contact position with the contact portion 1141, and the contact portion 1141 ensures a region for this.

In an arrangement in which a biasing force is simply generated by a coil spring or the like in the tangential direction (the direction perpendicular to the contact portion 1141) of the pivot of the upper unit 103, if a foreign substance or a sheet exists on the side of the contact portion 1141, it may be sandwiched between the upper elastic member 1140 and the contact portion 1141, and it may be difficult to reliably make the upper elastic member 1140 contact the contact portion 1141. On the other hand, even if a foreign substance or the like exists, the contact portion 1141 according to this embodiment can contact the contact portion 1141 by avoiding the foreign substance or the like when the upper unit 103 is closed while changing the contact position with the contact portion 1141, thereby implementing more reliable contact.

<Ground of CIS Unit>

Figure 20:
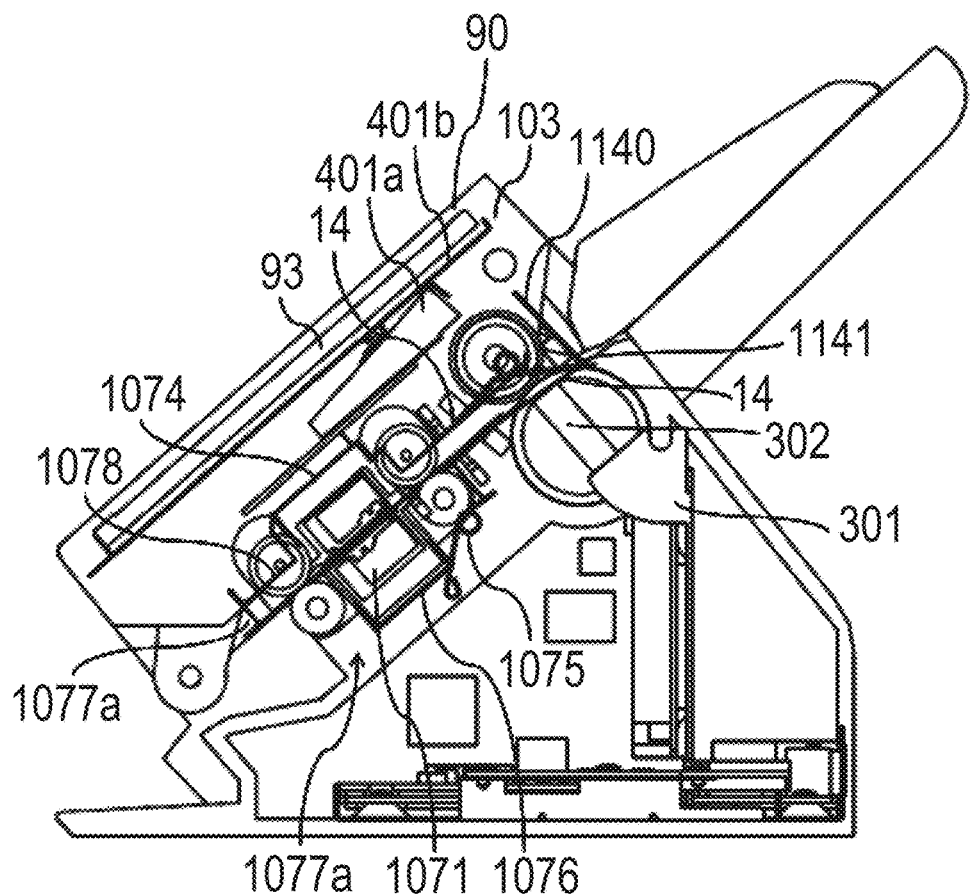
FIG. 20 is a sectional view showing the electrical connection state of the image reading apparatus according to the second embodiment of the present invention.

FIG. 20 is a view showing the electrical connection state in the apparatus sectional view of the image reading apparatus A according to this embodiment.

The image reading unit 70 is provided with a contact image sensor (to be referred to as a CIS hereinafter) 71.

When inserted into a storing portion 1077a of the lower unit 104, the image reading unit 70 is inserted while biasing a metal lower elastic member 1075 protruding from the side of the lower unit 104, and fitted and fixed at a storage completion position.

The lower surface of the image reading unit 70 is covered with a lower metal member 1076, and electric components such as the CIS 1071 in the image reading unit are protected from static electricity. The image reading unit 70 is inserted while biasing the lower elastic member 1075 by the lower metal member 1076, and thus grounded with respect to the lower unit 104.

The other image reading unit 70 is arranged at a position almost facing via the conveyance path RT, and stored, to be movable, in a storing portion 1077b provided with the upper metal member 1074 of the upper unit 103, and the electric components such as the CIS 1071 are protected from static electricity. The upper metal member 1074 has an elastic portion, and is electrically connected to the upper conveyance guide 13 by pressing the elastic portion against the upper conveyance guide 13. The upper metal member 1074 may be connected using a conductive member (for example, a torsion spring) instead of the elastic portion.

The upper metal member 1074 is electrically connected via an anti-static brush 1079 and a metal member 1078 on the downstream side of the upper unit 103. The anti-static brush 1079 eliminates static electricity charged on the surface of the conveyance medium S. The eliminated charges are electrically connected from the metal member 1078 to the upper conveyance guide 13 via an upper metal member 1074 to flow to ground of the lower unit 104 via the upper elastic member 1140.

Static electricity generated on the upper portion side by the conveyance medium S and static electricity generated on the conveyance medium S can be electrically connected from the anti-static brush 1079 to the side of the lower unit 104 by the upper elastic members 1140 by electrically connecting the respective conductive members.

Note that the upper conveyance guide 13, the upper metal member 1074, and the metal member 1078 may be implemented by identical components.

The upper metal member 1074 is also electrically connected to the electric components (for example, the display screen 93, the operation key 122, a substrate that controls detected signals of various sensors, and the like) in the display panel 90 provided in the upper unit 103 via conductive members 401a and 401b, and is grounded.

<Arrangement of Lower Unit>

The lower unit 104 includes the hook portions 202 that allow the upper unit 103 to be maintained in the closed state by engaging with the lock members 201 provided in the upper unit 103 in order to connect one end of the upper unit 103 by the main body hinge 105 for attaching the upper unit 103 to be rotatable and to prevent the other end from pivoting in the opening direction by the reaction of the upper elastic member 1140.

In addition, the lower unit 104 includes the actuator 86 for conveying the conveyance medium S, the driving rollers 21 and 31, the lower conveyance guide 14, the storage portion 1077 of the image reading unit 70, the communication unit 84 for controlling the actuator 86, a support frame 301, and the control unit 80.

One end of the lower conveyance guide 14 on the upstream side, that is attached to the lower unit 104, is biased by a coil spring 302, and the other end on the downstream side is connected to the lower metal member 1076 via the lower elastic member 1075. The side of coil spring 302, opposite to the side biasing the lower conveyance guide 14, biases the support frame 301, thereby electrically connecting the lower metal member 1076 and the lower conveyance guide 14 to the support frame 301.

As described above, static electricity generated in the lower portion side by the conveyance medium S can be electrically connected from the lower metal member 76 to the support frame via the respective electrical connection portions.

(Third Embodiment)

Figure 21:
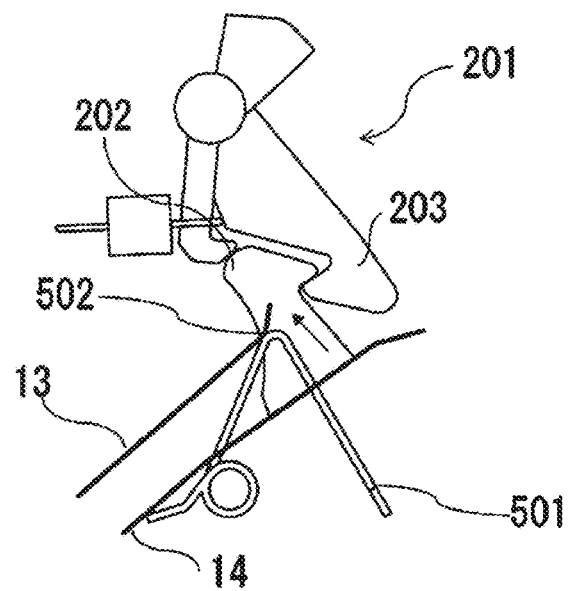
FIG. 21 is a sectional view showing the electrical connection state of an image reading apparatus according to the third embodiment of the present invention.

FIG. 21 is a schematic view showing an image reading apparatus B according to the third embodiment. In the image reading apparatus B, the lower elastic member 501 according to the second embodiment is attached to the side of a lower unit 104 and a contact portion 502 contacts part of an upper conveyance guide 13 attached to an upper unit 103. Other electrical connection routes are the same.

As described above, each of the image reading apparatuses according to the second and third embodiments includes a second unit to which a first unit including an electric component is pivotably attached, a sheet conveyance path formed between the first unit and the second unit in a closed state in which the first unit is closed with respect to the second unit, and an elastic member configured to press the first unit in an opening direction from the closed state, wherein the elastic member is a conductive member, and in the closed state, one end of the elastic member contacts a conductive portion of the first unit and the other end of the elastic member contacts a conductive portion of the second unit.

(Fourth Embodiment)

The fourth embodiment will be described below.

In a sheet-through reading apparatus disclosed in Japanese Patent Laid-Open No. 2009-278383 and the like, there is a need to detach a reading unit for the purpose of maintenance when dust entering the reading unit in use is to be cleaned, a reading sensor fails, or a reading glass is scratched. Normally, a facing reading unit copes with a case in which a floated facing reading unit is elastically pressed against a reading unit fixed to a frame to read a thick original.

However, when detaching the reading unit, the reading unit fixed to the frame needs to be released and pulled out of a storage portion provided in the frame, and is thus difficult to be detached from the frame.

This embodiment provides an image reading apparatus having an attachment/detachment structure for facilitating cleaning and maintenance of a reading unit placed in a conveyance path.

In the fourth embodiment, the structure shown in FIGS. 1 to 10 described in the first embodiment is in common with the first embodiment and a description thereof will be omitted. The difference from the first embodiment will be described.

Figure 24A:
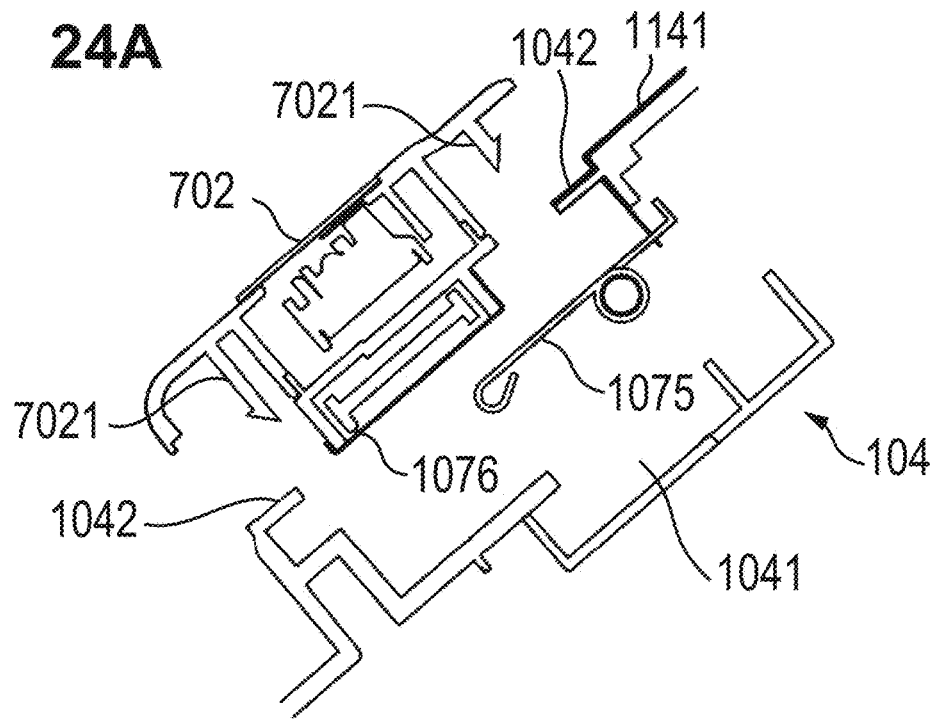
FIG. 24A is a schematic partial sectional view showing the image reading apparatus according to the fourth embodiment of the present invention.
Figure 24B:
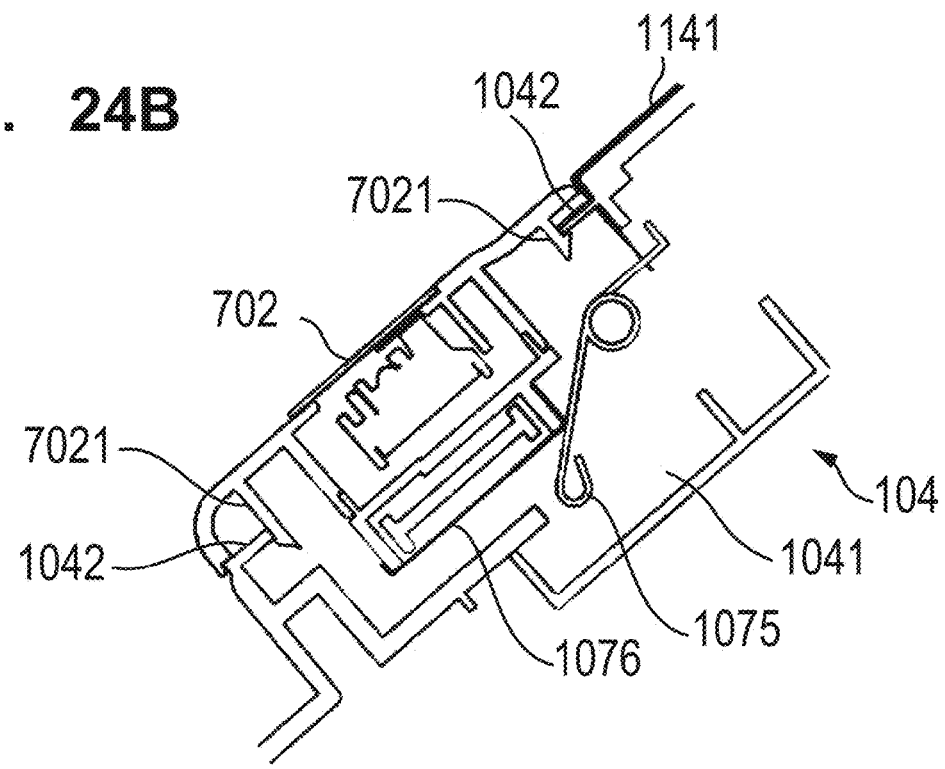
FIG. 24B is a schematic partial sectional view showing the image reading apparatus according to the fourth embodiment of the present invention.

FIGS. 24A and 24B are partial sectional views each showing an image reading apparatus according to the fourth embodiment. An image reading lower unit 702 includes a reading-side engaging means 7021. As shown in FIGS. 24A and 24B, when inserted into a storage portion 1401 provided in a lower unit 104, the image reading lower unit 702 is inserted while biasing a lower elastic member 1075 protruding from the side of the lower unit 104. In the stored state, the image reading lower unit 702 is fitted and fixed to a lower unit engaging portion 1042 by the reading-side engaging means 7021, as shown in FIG. 24B. If the image reading lower unit 702 is pressed in the stored state of the image reading lower unit 702, a butting portion 1403 provided in the lower frame storing portion 1401 regulates movement. Therefore, even if the image reading unit 702 is pressed in a state in which an upper unit 103 is opened, the image reading lower unit 702 abuts against the butting portion 1403 without retracting from a route RT, unlike an image reading upper unit 701, thereby regulating movement.

When the upper unit 103 is in the stored state, the image reading upper unit 701 is pressed against the image reading lower unit 702 by a predetermined force, and then stops if the image reading lower unit 702 abuts against the above-described butting portion 1403. In this state, when a conveyance medium S' thicker than a route RT' formed between the image reading upper unit 701 and the image reading lower unit 702 enters the image reading unit 70, the image reading upper unit 701 is pushed up by the conveyance medium S' to retract toward the upper unit 103. If the conveyance medium S' passes through the image reading unit 70, the image reading upper unit 701 is pressed against the image reading lower unit 702 again by an elastic member 7011.

The embodiment of the present invention will be disclosed in detail. Maintenance is performed in the open state of the upper unit 103, as shown in FIG. 8. At this time, the image reading upper unit 701 and the image reading lower unit 702 are released on the side of the route RT.

Figure 23A:
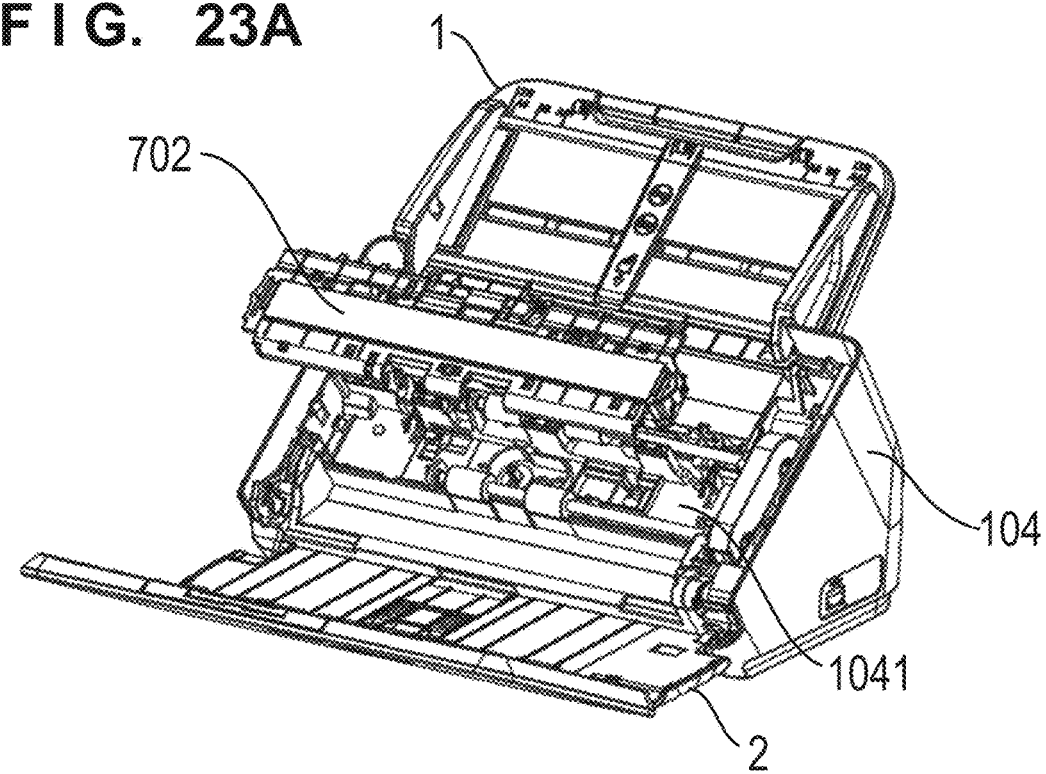
FIG. 23A is an enlarged view showing the main part of the image reading apparatus according to the fourth embodiment of the present invention.
Figure 23B:
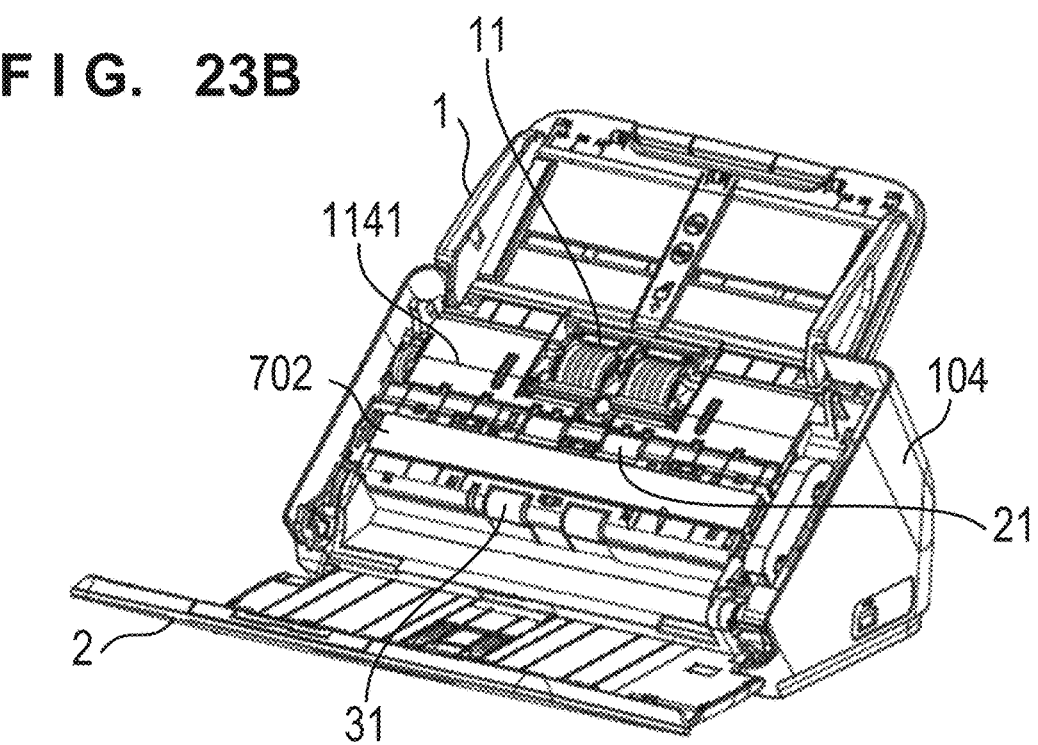
FIG. 23B is an enlarged view showing the main part of the image reading apparatus according to the fourth embodiment of the present invention.

FIGS. 23A and 23B are perspective views each showing the image reading lower unit 702 of an image reading apparatus A according to the fourth embodiment of the present invention. FIG. 23A shows a state in which the image reading lower unit 702 is detached. FIG. 23B shows a state in which the image reading lower unit 702 is stored.

Note that for the sake of simplicity, FIGS. 23A and 23B do not illustrate the upper unit 103. The image reading lower unit 702 is regulated by adjusting the biasing force of a butting portion 1043 or the elastic member 1075 so the image reading lower unit 702 does not retract from the route RT even when pressed by the image reading upper unit 701 facing the image reading lower unit 702 in the stored state.

Referring to FIG. 24B, if the reading-side engaging means 7021 is deflected by inserting a tool from a hole formed on the side of the route RT in the state in which the upper unit 103 is opened, as shown in FIG. 8, the image reading lower unit 702 is biased upward by the lower elastic member 1075, as shown in FIG. 24B. Thus, the image reading lower unit 702 is lifted to the route RT by the lower elastic member 1075, and the image reading lower unit 702 protrudes to the route RT. This structure allows the image reading lower unit 702 to be readily detached from the image reading apparatus A, thereby improving the maintainability.

Note that this embodiment has exemplified the structure in which the image reading upper unit 701 and the image reading lower unit 702 are arranged on both sides of the route RT to face each other. The present invention, however, is not limited to this. An arrangement in which the image reading lower unit 702 is arranged only on one side of the route RT to read only one surface of a conveyance medium S may be adopted. The image reading upper unit 701 and the image reading lower unit 702 may be arranged at an interval in the conveyance direction of the route RT, instead of arranging them to face each other.

This embodiment has explained an example in which the image reading lower unit 702 is fixed by fitting and fixing by the lower unit engaging portion 1042 and the reading-side engaging means 7021. The present invention, however, is not limited to this. It is possible to obtain the same effect even if, for example, the image reading lower unit 702 is fixed to the lower unit 104 using a fastening member such as a screw or the image reading lower unit 702 is fixed to the lower unit 104 using a magnetic force or the like.

Furthermore, in this embodiment, the image reading lower unit 702 abuts against the lower frame butting portion 1403 to regulate retraction of itself from the route RT. However, for example, by increasing the force of the lower elastic member 1075 to be larger than that of the elastic member 7011 for pressing the image reading upper unit 701, the image reading lower unit 702 may be prevented from retracting when an original enters.

If, as shown in FIGS. 24A and 24B, the lower surface of the image reading unit 702 is covered with the conductive member (lower metal member) 1076 made of a metal such as stainless steel, the lower surface functions as a noise shield material of an electric component such as a CIS 1071, and the conductive member 1076 serves as a ground surface exposed to the lower frame side of the image reading lower unit 702.

As shown in FIG. 24B, the lower elastic member 1075 applies, to the image reading lower unit 702, a predetermined pressure necessary for electrical connection at the storage position of the image reading lower unit 702. If, as shown in FIG. 24A, the lower elastic member 1075 is made to electrically contact the lower conveyance metal plate (contact portion) 1141, the lower elastic member 1075 is electrically connected to the lower unit 104. In this state, if the image reading lower unit 702 is assembled with the lower unit 104, as shown in FIG. 13, the image reading lower unit 702 is inserted while the conductive member 1076 is biased by the lower elastic member 1075. Therefore, the image reading lower unit 702 is electrically connected to the lower unit 104 at the storage completion position, and can operate without any electrical influence even if the charged conveyance medium S passes through the route RT.

<Ground of Upper Unit>

Figure 22:
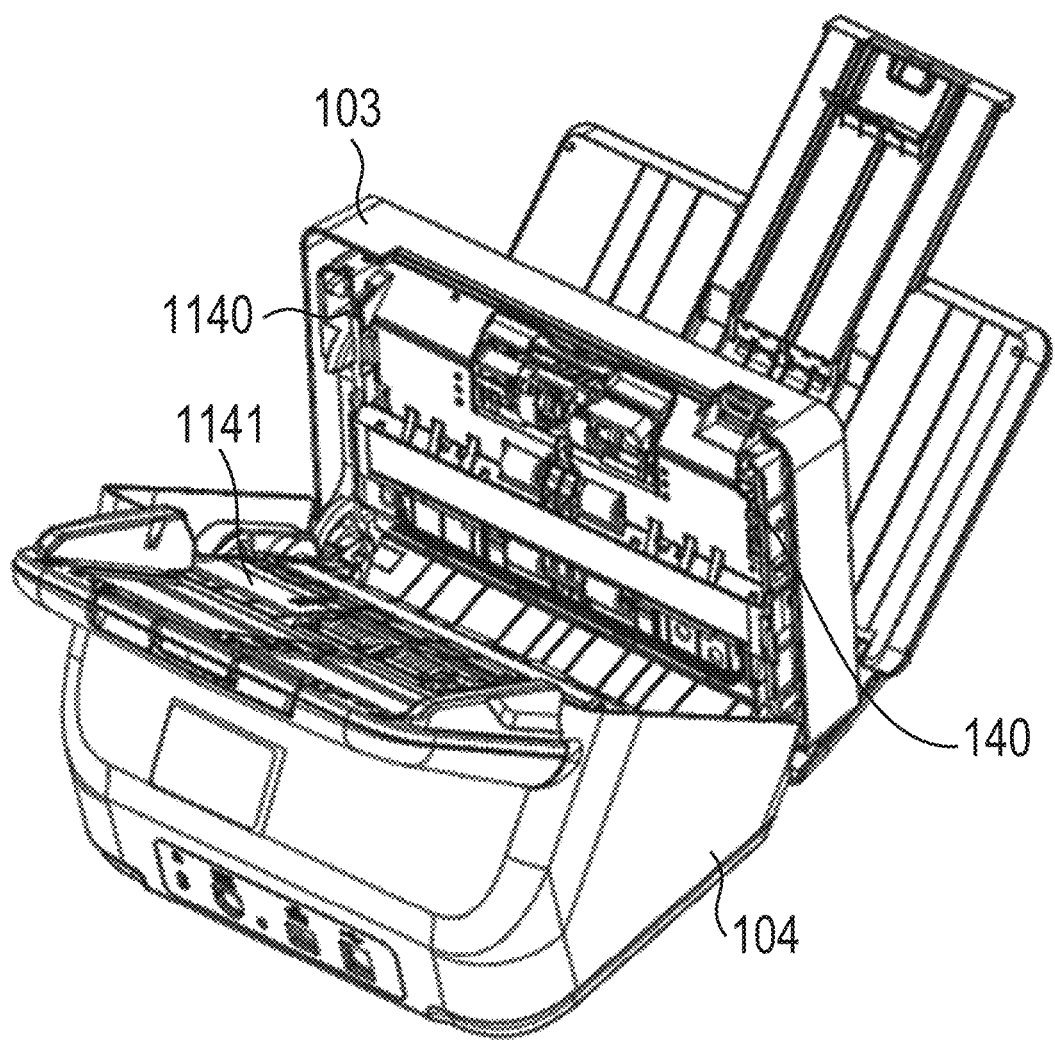
FIG. 22 is a perspective view showing an image reading apparatus according to the fourth embodiment of the present invention.

FIG. 22 is a perspective view showing a state in which the upper unit 103 of the image reading apparatus A is opened according to the fourth embodiment.

If the upper unit 103 is made to pivot quickly to be stored, when the upper unit 103 contacts the lower unit 104, a large impact may be applied to generate loud noise. In the image reading apparatus A according to this embodiment, metal upper elastic members 1140 are provided on both sides of a separation roller 12 of the upper unit 103.

The upper unit 103 is set in the stored state while the upper elastic members 1140 are elastically biased against contact portions 1411 of the lower conveyance metal plates (contact portions) 1141 provided on the side of the lower unit 104. The end portion of each upper elastic members 1140, that is attached to the upper unit 103, is electrically connected to ground of an electric component provided in the upper unit 130, and is electrically connected to ground of an electric component arranged in the lower unit when the upper elastic member 1140 contacts the contact portion 1411.

Therefore, in the stored state of the upper unit 103, the upper unit 103 can be grounded by an elastic buffer member.

As described above, an image reading apparatus according to the fourth embodiment includes a reading unit configured to read an original conveyed along a conveyance path, an opening/closing unit configured to be opened/closed to open the conveyance path, a fixing means, arranged along the conveyance path, for fixing the reading unit, and a reading unit releasing biasing means for biasing the fixed reading unit toward a side of the conveyance path, wherein the fixing means can be released from the side of the conveyance path, and if fixing of the reading unit by the fixing means is released, the reading unit is pushed out of a storage portion to the side of the conveyance path by the reading unit releasing biasing means.

(Fifth Embodiment)

The fifth embodiment will be described below.

There is known a technique of alternately switching the background color of an original between white and black in an image reading apparatus. If the background color is set to black, an original size is automatically detected, an inclined original is corrected by recognizing the boundary between the original and a background portion by the black background, and show-through is prevented when reading a thin original. On the other hand, by setting the background portion to white, dust or the like adhering to a glass surface arranged at a reading position is detected, and a vertical stripe appearing in a read image due to dust or the like is eliminated while white read data is used as reference data for sensitivity correction (shading correction) of a light receiving element.

Figure 35:
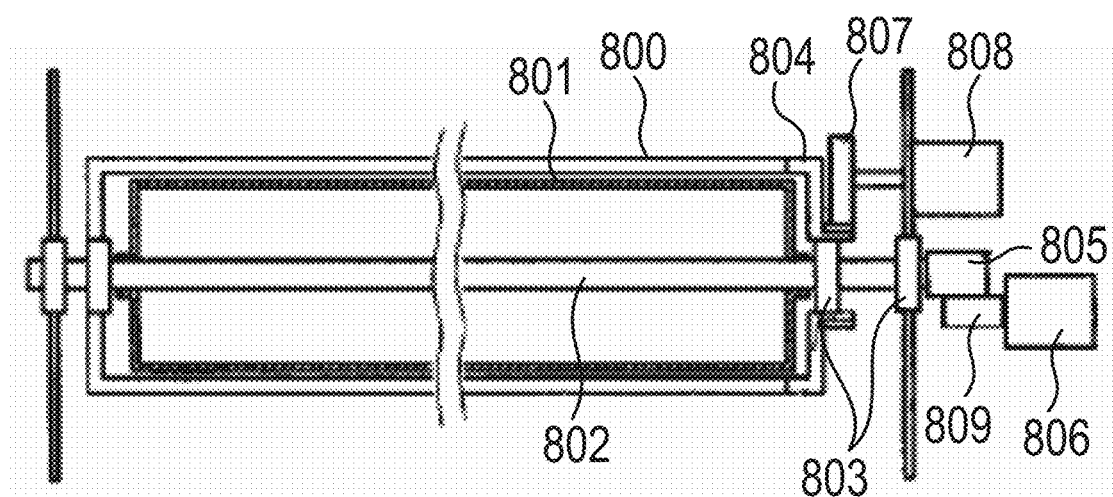
FIG. 35 is a schematic view showing a conventional background switching mechanism.

A conventional mechanism of switching the background color will be described with reference to FIG. 35.

A cylindrical transparent platen roller 800 and a cylindrical background plate 801 are supported by a shaft 802 via bearings 803. The cylindrical transparent platen roller 800 is sealed by a cover 804 so dirt/dust does not internally adhere to the cylindrical background plate 801. The cylindrical background plate 801 is fixed to the shaft 802, and rotationally driven by a motor 806 via a gear 805 fixed to the shaft 802. It is possible to switch the background color of a read image by holding the cylindrical background plate 801 facing the original reading position so as to select a white portion or black portion.

However, as described in Japanese Patent Laid-Open No. 2004-320331, if a motor for switching the background color is arranged on a side surface of the background plate, the width of the apparatus is unwantedly increased.

This embodiment provides a technique of downsizing the image reading apparatus.

In the fifth embodiment, the structures shown in FIGS. 1 to 10 described in the first embodiment and shown in FIG. 22 described in the fourth embodiment are in common with the first and fourth embodiments and a description thereof will be omitted. The difference from the first and fourth embodiments will be described.

<Ground of CIS Unit>

Figure 25A:
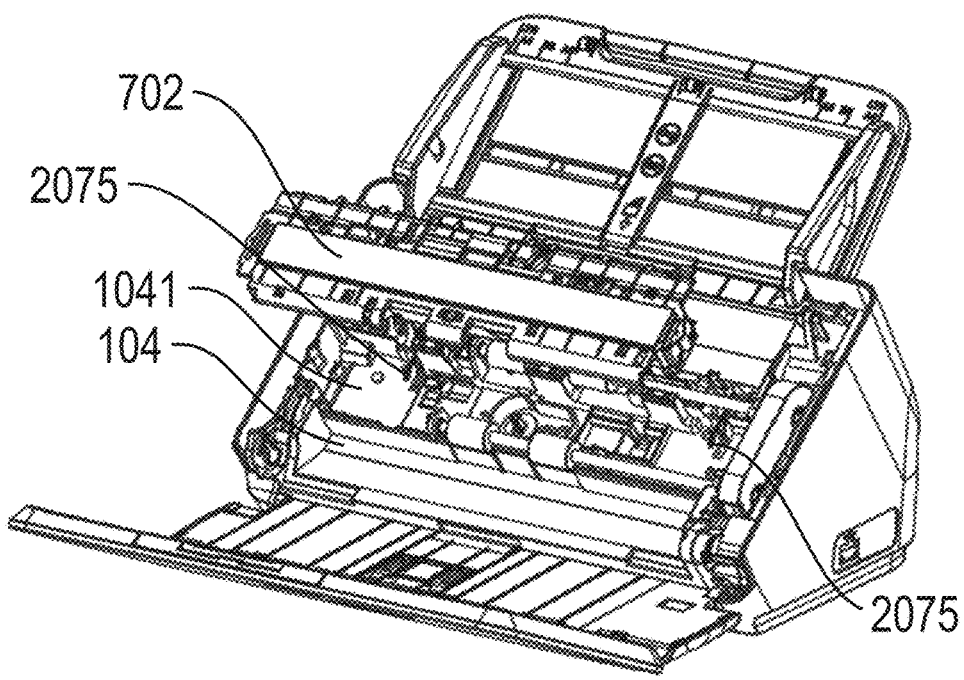
FIG. 25A is a perspective view showing an image reading apparatus according to the fifth embodiment of the present invention.
Figure 25B:
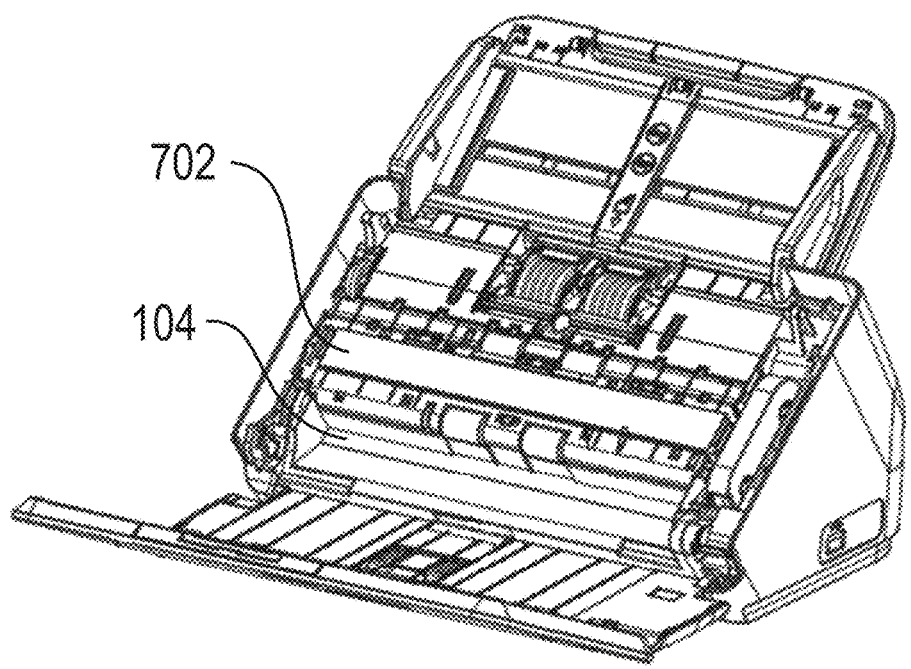
FIG. 25B is a perspective view showing the image reading apparatus according to the fifth embodiment of the present invention.

FIGS. 25A and 25B are perspective views when an image reading lower unit 702 of an image reading apparatus A is attached according to the fifth embodiment of the present invention. FIG. 25A shows a state before the image reading lower unit 702 is attached. FIG. 25B shows a state after the image reading lower unit 702 is attached.

When inserted into a lower reading storing portion 1041 of a lower unit 104, as shown in FIG. 25A, the image reading lower unit 702 is inserted while biasing metal lower elastic members 2075 protruding from the side of the lower unit 104, and fitted and fixed at a storage completion position, as shown in FIG. 25B.

Figure 26A:
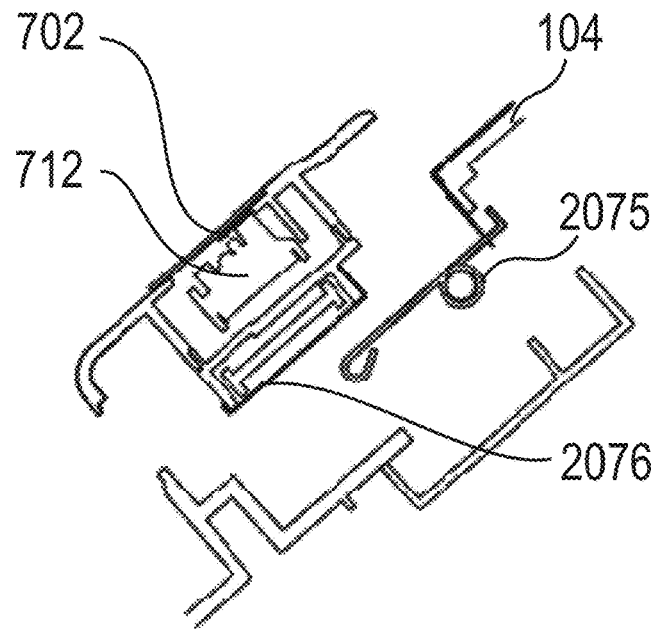
FIG. 26A is a schematic sectional view showing an image reading lower unit of the image reading apparatus according to the fifth embodiment of the present invention.
Figure 26B:
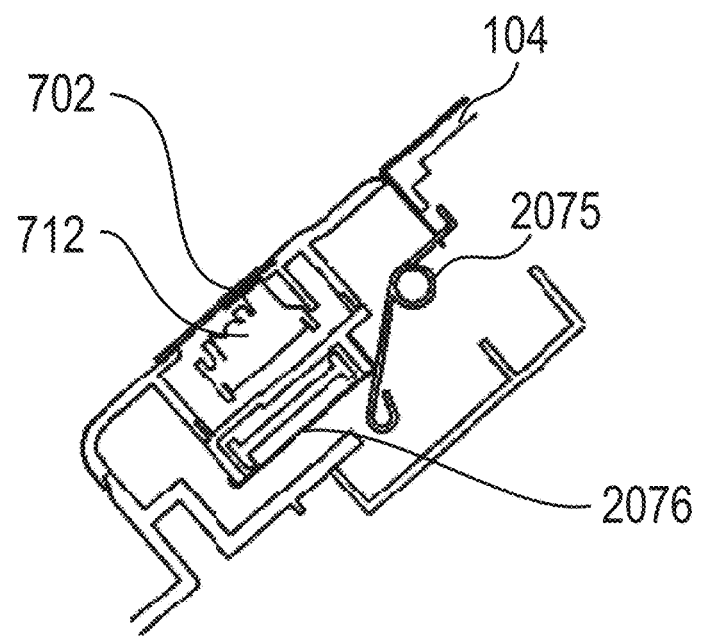
FIG. 26B is a schematic sectional view showing the image reading lower unit of the image reading apparatus according to the fifth embodiment of the present invention.

FIGS. 26A and 26B are schematic sectional views each showing a portion around the image reading lower unit 702 of the image reading apparatus A according to the fifth embodiment of the present invention. FIG. 26A shows a state before the image reading lower unit 702 is attached. FIG. 26B shows a state after the image reading lower unit 702 is attached.

The lower surface of the image reading lower unit 702 is covered with a metal member 2076, and grounded with an electric component such as a CIS 2071. When inserted while biasing the lower elastic members 2075 by the metal member 2076, the image reading lower unit 702 is grounded with respect to the lower unit 104.

Since the image reading lower unit 702 is biased upward by the lower elastic members 2075, it is lifted up only by releasing fitting and fixing, and it becomes easy to detach the image reading lower unit 702, thereby improving the maintainability.

<Arrangement of CIS>

An image reading unit according to this embodiment will be disclosed in detail.

Each of an image reading upper unit 701 and the image reading lower unit 702 on the downstream side of a medium detection sensor 60 is, for example, a unit for optically scanning, performing conversion into an electrical signal, and reading the signal as image data, and includes a light source such as an LED, an image sensor, and a lens array. In this embodiment, the image reading upper unit 701 is arranged in an upper reading storage portion (not shown) provided in an upper unit 103, and the image reading lower unit 702 is arranged in the lower reading storing portion 1041 provided in the lower unit 104. These reading units read the obverse and reverse surfaces of a conveyance medium S. However, one reading unit may be arranged in one of the upper unit 103 and the lower unit 104 to read only one surface of the conveyance medium S. This embodiment adopts the structure in which the image reading upper unit 701 and the image reading lower unit 702 are arranged to face each other on both sides of a route RT. However, for example, the image reading upper unit 701 and the image reading lower unit 702 may be arranged at an interval in the direction of the route RT.

The image reading lower unit 702 is fixed to the lower unit 104. On the other hand, the image reading upper unit 701 is movably supported by a press spring (not shown). This allows the image reading upper unit 701 to be translated in a direction perpendicular to a conveyance surface, thereby smoothly performing image reading and conveyance of a thick original.

Figure 27A:
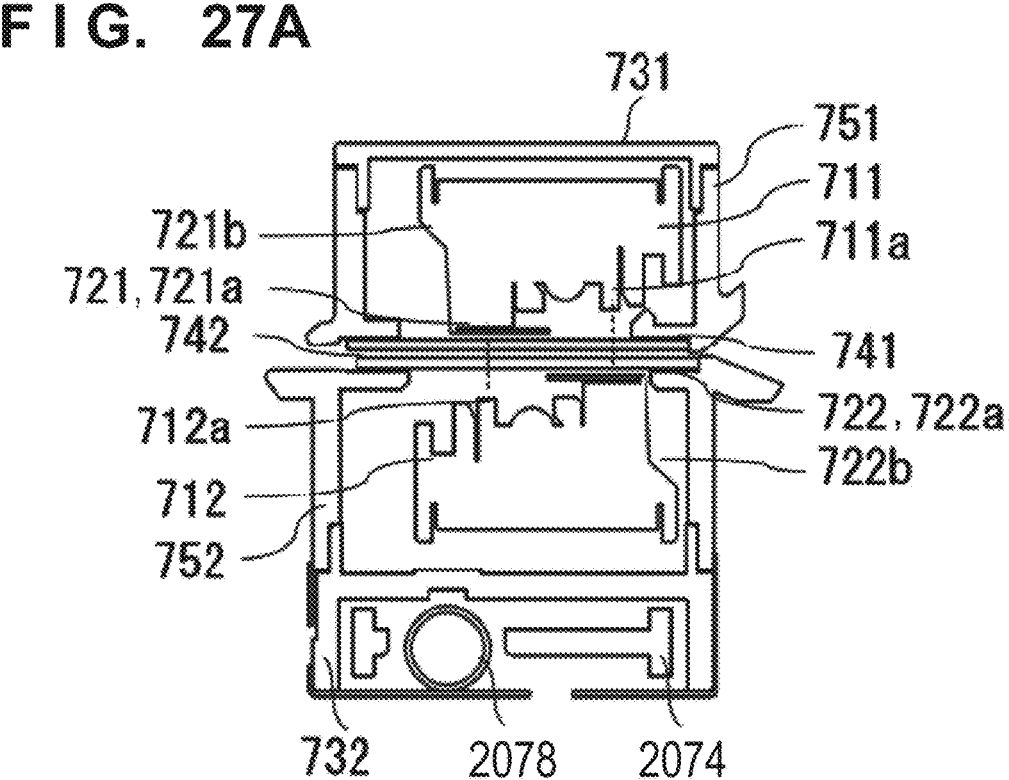
FIG. 27A is a schematic sectional view showing image reading units of the image reading apparatus according to the fifth embodiment of the present invention.
Figure 27B:
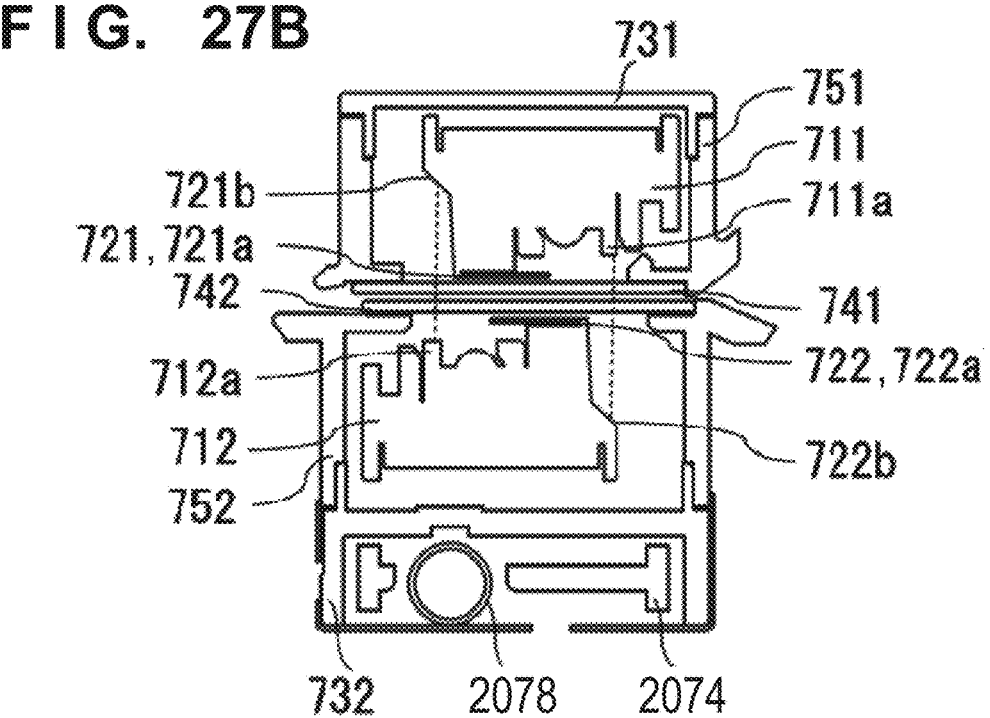
FIG. 27B is a schematic sectional view showing the image reading units of the image reading apparatus according to the fifth embodiment of the present invention.

FIGS. 27A and 27B are vertical partial sectional views each showing the image reading upper unit 701 and the image reading lower unit 702 of the image reading apparatus A according to the fifth embodiment of the present invention. FIG. 27A shows a state when facing a white reference portion. FIG. 27B shows a state when facing a black reference portion.

The arrangements of the image reading upper unit 701 and the image reading lower unit 702 will be described with reference to FIGS. 27A and 27B. The image reading upper unit 701 is formed by a CIS 711 including a rod lens 711a for reading an image, a color reference member 721 including a white reference portion 721a, a contact glass 741 for guiding an original to an original reading position, a sensor case 751 for storing the CIS 711 and the color reference member 721 and holding the contact glass 741, and a cover 731 serving as the cover of the sensor case. In this embodiment, the white reference portion 721a of the color reference member 721 is integrated with the CIS 711 by adhesion, bonding, coating, or another method, and a black reference portion 721b is formed in part of the CIS 711.

Similarly to the above arrangement of the image reading upper unit 701, the image reading lower unit 702 is formed by a CIS 712 including a rod lens 712a for reading an image, a color reference member 722 including a white reference portion 722a, a contact glass 742 for guiding an original to the original reading position, a sensor case 752 for storing the CIS 712 and the color reference member 722 and holding the contact glass 742, and a cover 732 serving as the cover of the sensor case, and additionally includes a translating cam 74 for moving the CIS 712 to a predetermined position and a cam return spring 2078 for biasing the translating cam 2074 to move the moved CIS 712 to the first position (initial position).

Figure 28A:
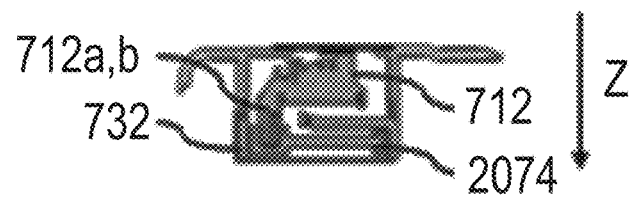
FIG. 28A is another schematic sectional view showing the image reading lower unit of the image reading apparatus according to the fifth embodiment of the present invention.
Figure 28B:
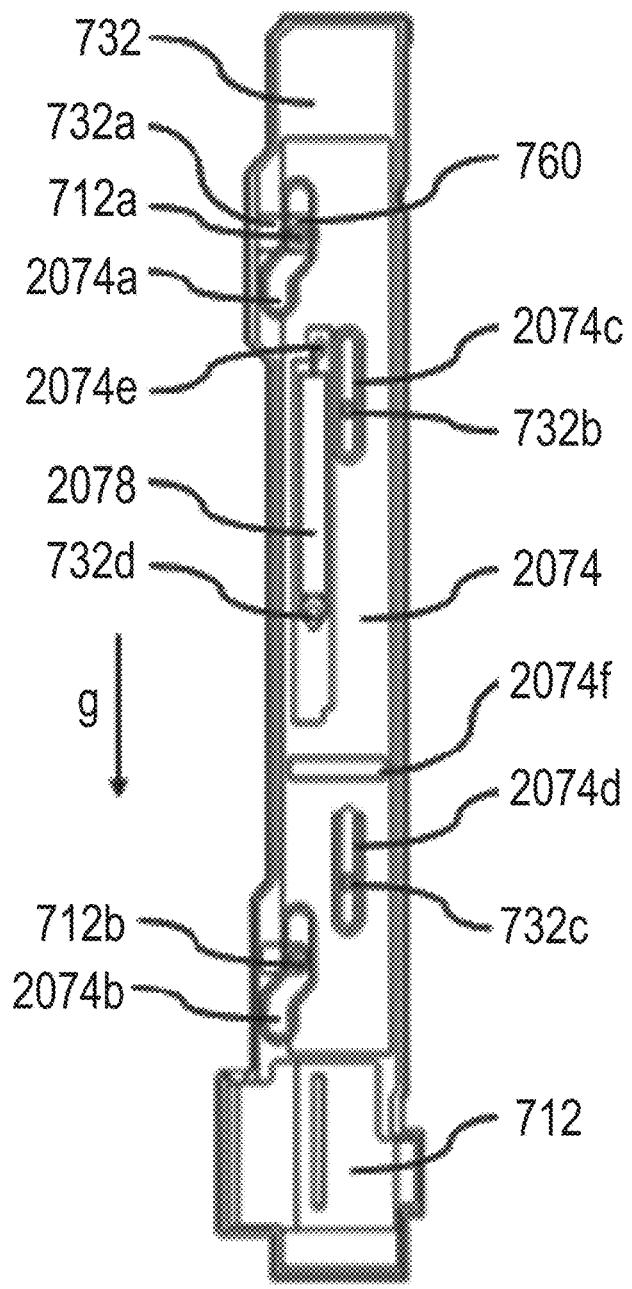
FIG. 28B is still another schematic sectional view showing the image reading lower unit of the image reading apparatus according to the fifth embodiment of the present invention.
Figure 29A:
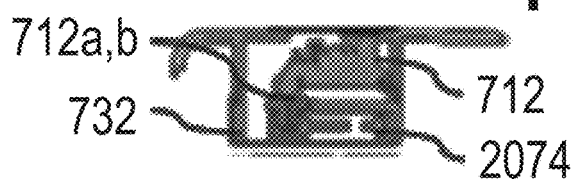
FIG. 29A is still another schematic sectional view showing the image reading lower unit of the image reading apparatus according to the fifth embodiment of the present invention.
Figure 29B:
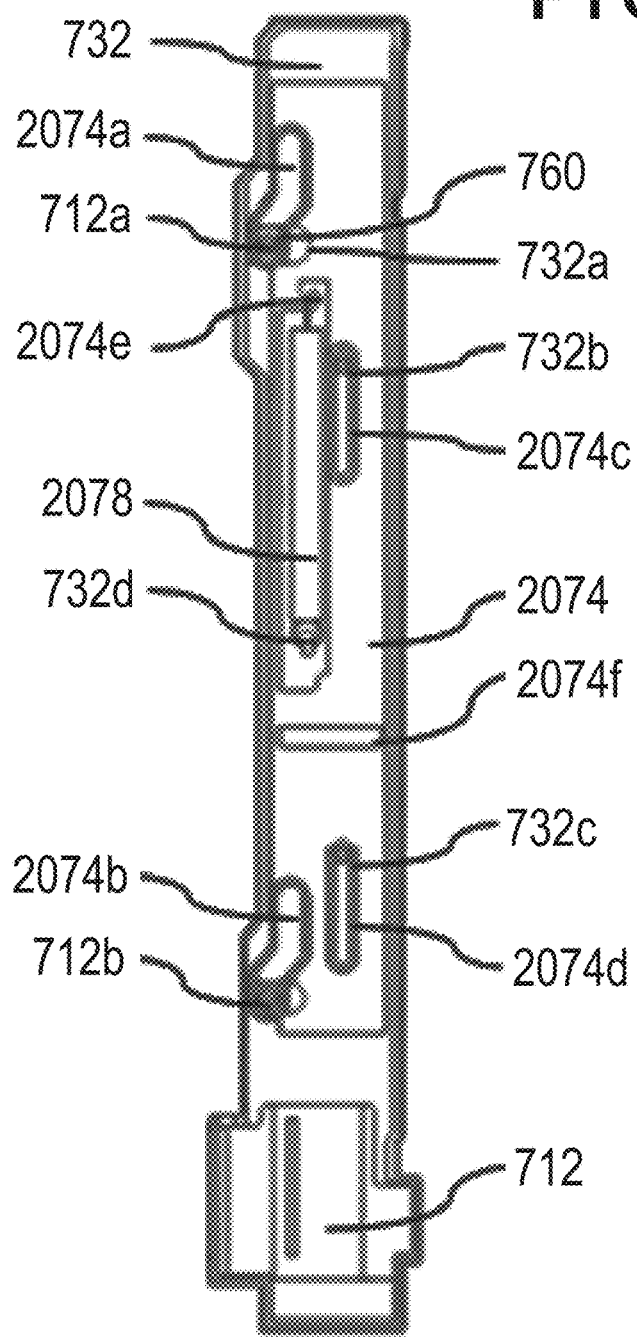
FIG. 29B is still another schematic sectional view showing the image reading lower unit of the image reading apparatus according to the fifth embodiment of the present invention.

FIG. 28A is a vertical partial sectional view showing the image reading lower unit 702 when facing the black reference portion. FIG. 28B is a horizontal partial sectional view showing the image reading lower unit 702 when facing the black reference portion. FIG. 29A is a vertical partial sectional view showing the image reading lower unit 702 when facing the white reference portion. FIG. 29B is a horizontal partial sectional view showing the image reading lower unit 702 when facing the white reference portion.

The CIS 712 includes the projection 712a and a projection 712b extending in the direction of an arrow z in FIG. 28A. The projection 712a is fitted in a cam groove 2074a formed in the translating cam 2074. Furthermore, the projection 712a is fitted, via a sliding member 760, in an elongated hole 732a formed in the lower cover 732, thereby regulating movement in the main scanning direction. On the other hand, the projection 712b is fitted in a cam groove 2074b formed in the translating cam 2074. Furthermore, since the CIS 712 slides with the lower cover 732 via the highly slidable sliding member 760, wear of the CIS 712 with the lower cover 732 and cam groove 2074a by movement of the CIS 712 can be reduced.

The translating cam 2074 includes the cam grooves 2074a and 2074b in which the projections 712a and 712b of the CIS 712 are fitted, elongated holes 2074c and 2074d in which projections 732b and 732c formed in the lower cover 732 are fitted, and a hook portion 2074e on which the cam return spring 2078 is hooked.

The translating cam 2074 is locked with a locking portion 732d of the lower cover 732 by the cam return spring 2078, and pulled in the direction of an arrow g in FIG. 28B. When facing the white reference portion at the first position (initial position), the projections 712a and 712b are located closer to the right side, as shown in FIG. 28A. On the other hand, when facing the black reference portion at a predetermined position, the projections 712a and 712b are located closer to the left side, as shown in FIG. 29A.

In this way, when the translating cam 2074 is engaged with the CIS 712 to be moved in the main scanning direction as the longitudinal direction of the CIS 712, the CIS 712 is moved in a sub-scanning direction to one of a position facing the white reference portion 721a of the color reference member 721 provided in the image reading upper unit 701 and a position facing the black reference portion 721b. This switches the background color of the original when reading an image of the original.

If only the CIS 712 is moved as in this embodiment, a load on a CIS sliding motor 2073 can be decreased, thereby downsizing the motor and reducing the power consumption.

Note that it is possible to determine, based on an output from a position detection sensor 770, whether the CIS 712 has been moved to the position facing the white reference portion 721a of the color reference member 721 or the position facing the black reference portion 721b. The position detection sensor 770 is a detection means for detecting the position of the translating cam 2074, and indirectly detects which of the white reference portion 721a and the black reference portion 721b the position of the CIS 712 faces, by detecting the position of the translating cam 2074.

In this image reading apparatus, when the CIS 712 moves between the position facing the white reference portion 721a and the position facing the black reference portion 721b, if the CIS 712 shifts with respect to the original image reading position, the edge position in original reading (the reading position) unwantedly shifts. If the edge position shifts, an image at the leading edge or trailing edge of the original is missed, thereby degrading the quality of the read image. To prevent the edge position from shifting, the position of the CIS 712 at the time of original reading is detected using the position detection sensor 770.

In this embodiment, the edge position is prevented from shifting by changing, between the position facing the white reference portion and the position facing the black reference portion, a timing after the medium detection sensor 60 detects the leading edge of the original before reading of an image of the original starts in accordance with the position of the CIS 712 detected by the position detection sensor 770.

Figure 30:
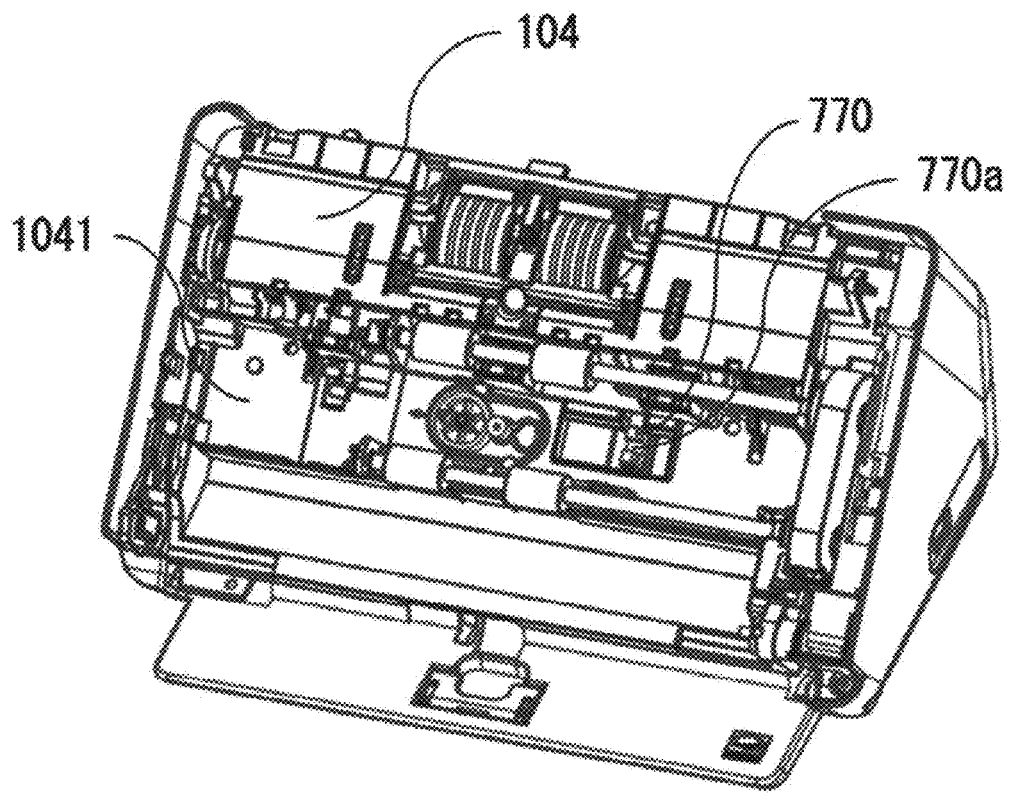
FIG. 30 is a perspective view showing a portion around a position detection sensor in a state in which the image reading lower unit of the image reading apparatus is detached according to the fifth embodiment of the present invention.

In this embodiment, the position detection sensor 770 is arranged on the opposite surface of the conveyance surface of the image reading lower unit 702 of the lower reading storing portion 1041 provided in the lower unit 104, as shown in FIG. 30.

The operation of detecting the position of the translating cam 2074 by the position detection sensor 770 will be described with reference to FIG. 31.

Figure 31:
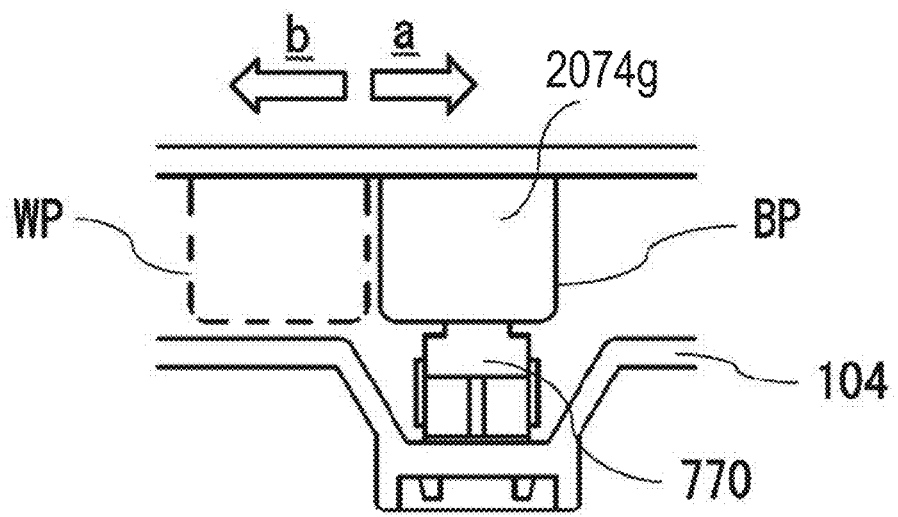
FIG. 31 is schematic sectional view showing the portion around the position detection sensor of the image reading apparatus according to the fifth embodiment of the present invention.

When the power of the image reading apparatus is turned on, the translating cam 2074 is moved in the direction of an arrow a in FIG. 31 to a position where a projecting portion 2074g of the translating cam 2074 blocks a slit 770a of the position detection sensor 770 shown in FIG. 17 (a position where the position detection sensor 770 is turned on: BP). The position BP is a position where the CIS 712 faces the black reference portion 712b. Then, the translating cam 2074 is moved in the direction of an arrow b in FIG. 31 to a position (WP) where a gear 2079 (to be described later) is half rotated. The position WP is a position where the CIS 712 faces the white reference portion 712a. This series of operations is the initialization operation of the background switching mechanism that is performed every time the power of the apparatus is turned on.

After the initialization operation, if the background color is set to white to start image reading, white reference data for shading correction is read by maintaining the translating cam 2074 at the position WP without moving it. An image of a conveyed original is then read.

If the background color is set to black, after white reference data for shading correction is read, similarly to the case in which the background color is white, the translating cam 2074 is moved to the position BP to read an image of a conveyed original.

The arrangement of a CIS driving unit will be described next with reference to FIGS. 32 and 33.

Figure 32:
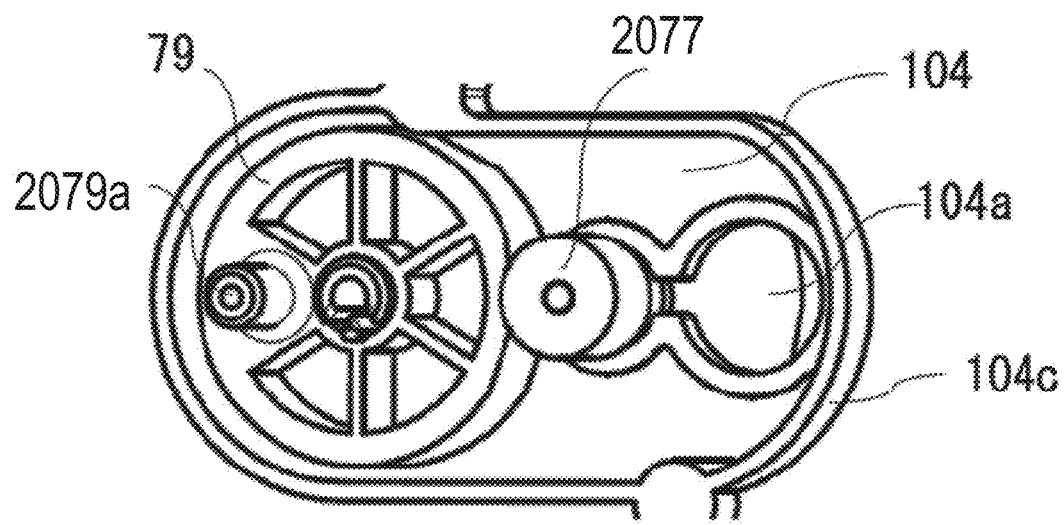
FIG. 32 is a perspective view showing a CIS driving unit of the image reading apparatus according to the fifth embodiment of the present invention.

FIG. 32 is a perspective view showing a portion around the CIS driving unit in a state in which the image reading lower unit 702 is detached. FIG. 33 is a partial sectional view showing the portion around the CIS driving unit.

As shown in FIG. 32, the lower unit 104 includes a through hole 104a through which a fitting portion of the CIS sliding motor 2073 and the translating cam 2074 extends.

Furthermore, a protruding portion 104c is provided in the lower reading storing portion 1041 of the lower unit 104 to cover the through hole 104a and the CIS driving unit (to be described later). The protruding portion 104c reduces accumulation of a paper powder falling from the conveyance path to the lower reading storing portion 1041 through the through hole 104a on a component provided in the lower unit 104 or the CIS driving unit.

Figure 33:
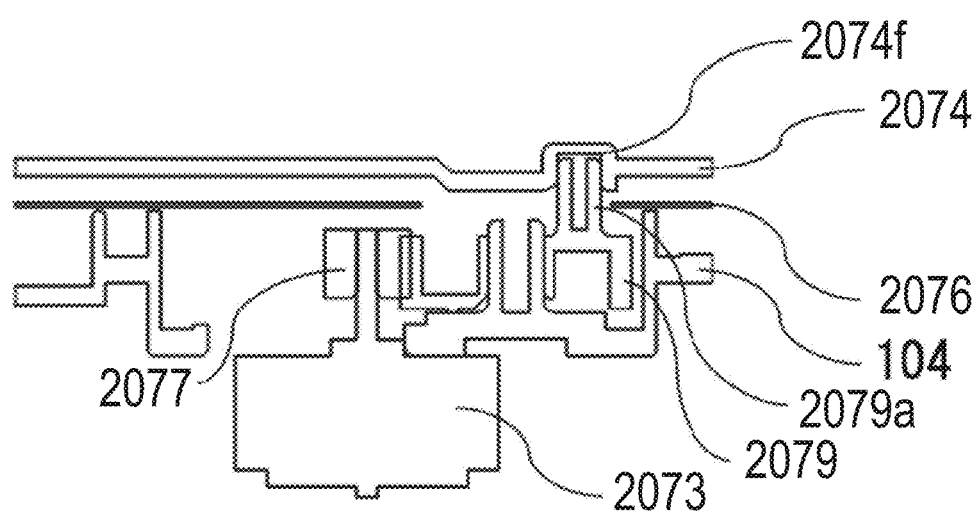
FIG. 33 is a schematic sectional view showing the CIS driving unit of the image reading apparatus according to the fifth embodiment of the present invention.

As shown in FIG. 33, the CIS driving unit includes the gear 2079 that transfers a driving force to the translating cam 2074, the CIS sliding motor 2073 that operates a pinion gear 2077, and the pinion gear 2077 that is pressed in the CIS sliding motor 2073 and abuts against the gear 2079.

A projection 2079a fitted in a cam groove 2074f formed in the translating cam 2074 is provided in the gear 2079. If the CIS sliding motor 2073 rotates, a driving force is transferred to the pinion gear 2077, the gear 2079, and the translating cam 2074, and the translating cam 2074 moves in the main scanning direction.

Figure 34:
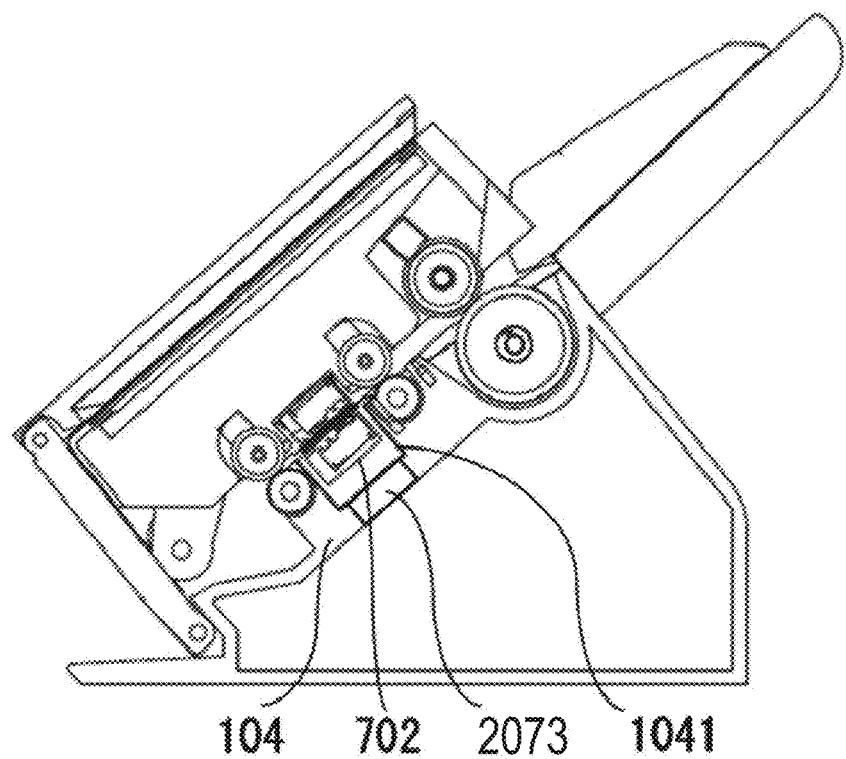
FIG. 34 is a schematic sectional view showing a portion around a CIS sliding motor of the image reading apparatus according to the fifth embodiment of the present invention.

As shown in FIG. 34, the CIS sliding motor 2073 is arranged on the surface opposite to the conveyance path of the lower reading storing portion 1041 provided in the lower unit 104. That is, the CIS sliding motor 2073 is arranged on the surface of the image reading lower unit 702 opposite to the surface on the conveyance path side via the lower reading storing portion 1041. It is possible to decrease the dimension in the width direction of the apparatus main body by arranging the CIS sliding motor 2073 on the surface of the image reading lower unit 702 opposite to the surface on the conveyance path side.

By integrating the CISs 711 and 712 and the color reference members 721 and 722, respectively, as in this embodiment, it is possible to switch the background colors of the obverse and reverse surfaces only by moving one CIS 712 even in the image reading apparatus for double-sided simultaneous reading. Therefore, it is unnecessary to provide, for each of the two reading units 701 and 702, the translating cam 2074 and the CIS driving unit for driving the unit. As a result, it is possible to downsize the apparatus by reducing the space where these components are provided, and reduce the cost of the apparatus by decreasing the number of components.

In this embodiment, the CIS driving unit is arranged not in the reading lower unit 702 but in the lower unit 104, thereby making it possible to detach only the reading lower unit 702 from the apparatus. The unit dealt with in maintenance is small, thereby improving the maintainability.

Especially, by providing the translating cam 2074 for moving the CIS 712 under the image reading lower unit 702, it is possible to switch the background without widening the image reading apparatus A in the width direction.

As described above, the image reading apparatus according to the fifth embodiment includes an apparatus main body including a conveyance means for conveying an original, a sensor case mounted along a conveyance path of the apparatus main body, a reading sensor provided to be movable in a conveyance direction of the original in the sensor case and configured to read one surface of the original, a background member provided to face the reading sensor via the conveyance path and including a first background portion and a second background portion arranged side by side in the conveyance direction of the original, and a sensor moving member configured to move the reading sensor in the conveyance direction of the original, wherein the sensor moving member is engaged with the reading sensor by being attached to the sensor case from an opposite side of the conveyance path, and includes a driving source configured to transfer a driving force from an opposite side of the side of the reading sensor to the sensor moving member.

The present invention is not limited to the above-described embodiments, and various changes and modifications can be made within the spirit and scope of the present invention. Therefore, to apprise the public of the scope of the present invention, the following claims are made.

The invention claimed is:

1. An image reading apparatus comprising:
    an apparatus main body including a feeding unit for feeding a sheet;
    a first reading sensor provided in a first reading unit and configured to read one surface of the sheet moving along a conveyance path;
    a second reading sensor provided in a second reading unit provided to face the first reading sensor via the conveyance path and configured to read an image on the other surface of the sheet;
    a first background portion provided at a readable position of the first reading sensor and serving as a reading background of the first reading sensor;
    a second background portion provided at a readable position of the second reading sensor and serving as a reading background of the second reading sensor;
    a third background portion which is opposite to the second reading sensor in the direction parallel to the conveyance path with respect to the first background portion; and
    a moving portion configured to integrally move the first reading sensor and the second background portion along the conveyance path,
    wherein the first reading unit includes a sensor case in which the first reading sensor is provided, and the sensor case is fixed to the apparatus main body,
    wherein the first reading sensor is able to move between a position where the first reading sensor faces to the first background portion and receives reflection light from the first background portion and a positon where a black background portion which does not have surface reflecting light to the first reading sensor is placed, and
    wherein the third background portion has an inclined surface on the first background portion side, and wherein a position of the black background is a position where the first reading unit faces to the inclined surface.

2. The image reading apparatus according to claim 1, wherein the reading backgrounds of the first reading sensor and the second reading sensor can be switched simultaneously by causing the moving portion to integrally move the first reading sensor and the second background portion along the conveyance path.

3. The image reading apparatus according to claim 1, further comprising
    a fourth background portion which is opposite to the second reading sensor is arranged parallel to the second background portion in the conveyance path.

4. The image reading apparatus according to claim 3, wherein the second reading sensor, the first background portion, and the third background portion are arranged adjacent to each other in that order, and the first reading sensor, the second background portion, and the fourth background portion are arranged adjacent to each other in that order.

5. The image reading apparatus according to claim 3, wherein background colors of the first background portion and the second background portion are white, and the third background portion and the fourth background portion are black.

6. The image reading apparatus according to claim 1, wherein the second reading sensor is movable in a direction perpendicular to a conveyance direction.

7. The image reading apparatus according to claim 1, wherein the third background portion is a wall surface of a fixing member to which the first background portion is attached.

8. The image reading apparatus according to claim 1, wherein the inclined surface forms an obtuse angle with a normal to the conveyance path.

9. The image reading apparatus according to claim 1, wherein a wall surface, facing the third background portion in parallel to the conveyance path, of the first reading unit is a dark color surface.

10. The image reading apparatus according to claim 1, wherein the first reading unit and the second reading unit have structures arranged to have point symmetry with respect to the conveyance path.

11. The image reading apparatus according to claim 1, further comprising:

a second unit to which a first unit including an electric component is pivotably attached;

a sheet conveyance path formed between the first unit and the second unit in a closed state in which the first unit is closed with respect to the second unit; and an elastic member configured to press the first unit in an opening direction from the closed state, wherein the elastic member is a conductive member, and in the closed state, one end of the elastic member contacts a conducting portion of the first unit and the other end of the elastic member contacts a conducting portion of the second unit.

12. The image reading apparatus according to claim 1, further comprising:

a reading unit configured to read an original conveyed along a conveyance path;

an opening/closing unit configured to be opened/closed to open the conveyance path;

a fixing unit, arranged along the conveyance path, for fixing the reading unit; and a reading unit releasing biasing unit for biasing the fixed reading unit toward a side of the conveyance path, wherein the fixing unit can be released from the side of the conveyance path, and if fixing of the reading unit by the fixing unit is released, the reading unit is pushed out of a storage portion to the side of the conveyance path by the reading unit releasing biasing unit.

13. The image reading apparatus according to claim 1, further comprising:

an apparatus main body including a conveyance unit for conveying an original;

a sensor case mounted along a conveyance path of the apparatus main body;

a reading sensor provided to be movable in a conveyance direction of the original in the sensor case and configured to read one surface of the original;

a background member provided to face the reading sensor via the conveyance path and including a first background portion and a second background portion arranged side by side in the conveyance direction of the original; and a sensor moving member configured to move the reading sensor in the conveyance direction of the original, wherein the sensor moving member is engaged with the reading sensor by being attached to the sensor case from an opposite side of the conveyance path, and includes a driving source configured to transfer a driving force from an opposite side of the side of the reading sensor to the sensor moving member.

\* \* \* \* \*